US012533269B2

(12) United States Patent
Betancourt et al.

(10) Patent No.: US 12,533,269 B2
(45) Date of Patent: Jan. 27, 2026

(54) ABSORBENT ARTICLE COMPRISING A FRAGRANCE AND AN ODOR CONTROL COMPOSITION

(71) Applicant: The Procter & Gamble Company, Cincinnati, OH (US)

(72) Inventors: Jose Enrique Betancourt, West Chester, OH (US); Misael Omar Aviles, Hamilton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 340 days.

(21) Appl. No.: 18/467,750

(22) Filed: Sep. 15, 2023

(65) Prior Publication Data

US 2024/0115437 A1 Apr. 11, 2024

Related U.S. Application Data

(60) Provisional application No. 63/406,718, filed on Sep. 15, 2022.

(51) Int. Cl.
*A61F 13/84* (2006.01)
*A61F 13/15* (2006.01)
*A61L 15/26* (2006.01)
*A61L 15/46* (2006.01)
*A61L 15/48* (2006.01)

(52) U.S. Cl.
CPC .... *A61F 13/8405* (2013.01); *A61F 13/15577* (2013.01); *A61L 15/26* (2013.01); *A61L 15/46* (2013.01); *A61L 15/48* (2013.01); *A61F 2013/8408* (2013.01); *A61L 2300/232* (2013.01); *A61L 2300/626* (2013.01); *A61L 2300/802* (2013.01)

(58) Field of Classification Search
CPC ............ A61F 13/8405; A61F 13/15577; A61F 2013/8408; A61L 2300/232; A61L 2300/626; A61L 2300/802; A61L 15/26; A61L 15/46; A61L 15/48
USPC ......................................................... 604/359
See application file for complete search history.

(56) References Cited

U.S. PATENT DOCUMENTS

| 5,942,217 | A | 8/1999 | Woo et al. |
| 8,686,215 | B2 | 4/2014 | Caputi et al. |
| 8,835,511 | B2 * | 9/2014 | Carlucci ............. A61F 13/8405 512/26 |
| 10,427,133 | B2 | 10/2019 | Scavone et al. |
| 11,090,250 | B2 | 8/2021 | Scavone et al. |

(Continued)

FOREIGN PATENT DOCUMENTS

| CN | 105997718 A | 10/2016 |
| WO | 9738647 A2 | 10/1997 |

(Continued)

OTHER PUBLICATIONS

PCT Search Report and Written Opinion for PCT/US2023/073919 dated Nov. 28, 2023, 13 pages.

*Primary Examiner* — Andrew J Mensh
(74) *Attorney, Agent, or Firm* — Anna E. Haller; Amanda Herman Berghauer

(57) ABSTRACT

This application generally relates to absorbent articles comprising aqueous-based odor control compositions and non-complexed perfume compositions, applied in patterns which do not substantially overlap, and methods of making the same.

17 Claims, 4 Drawing Sheets

(56) References Cited

U.S. PATENT DOCUMENTS

| | | |
|---|---|---|
| 11,123,235 B2 | 9/2021 | Bianchi et al. |
| 11,173,078 B2 * | 11/2021 | Hubbard, Jr. ..... A61F 13/15707 |
| 2002/0150431 A1 * | 10/2002 | Ofosu-Asante ........... D06L 1/04 |
| | | 405/258.1 |
| 2002/0175092 A1 * | 11/2002 | Stulens ................... A47L 13/22 |
| | | 206/229 |
| 2005/0215459 A1 * | 9/2005 | Policicchio .......... C11D 17/049 |
| | | 510/438 |
| 2013/0158491 A1 | 6/2013 | Caputi et al. |
| 2014/0180228 A1 * | 6/2014 | Caputi ................ A61F 13/8405 |
| | | 604/359 |
| 2017/0368218 A1 | 12/2017 | Scavone et al. |
| 2018/0064588 A1 | 3/2018 | Sturgis |
| 2023/0042590 A1 | 2/2023 | Betancourt et al. |

FOREIGN PATENT DOCUMENTS

| | | |
|---|---|---|
| WO | 2008104954 A2 | 9/2008 |
| WO | 2014205047 A1 | 12/2014 |
| WO | 2014205048 A1 | 12/2014 |
| WO | 2014205053 A1 | 12/2014 |
| WO | 2017223443 A1 | 12/2017 |

\* cited by examiner

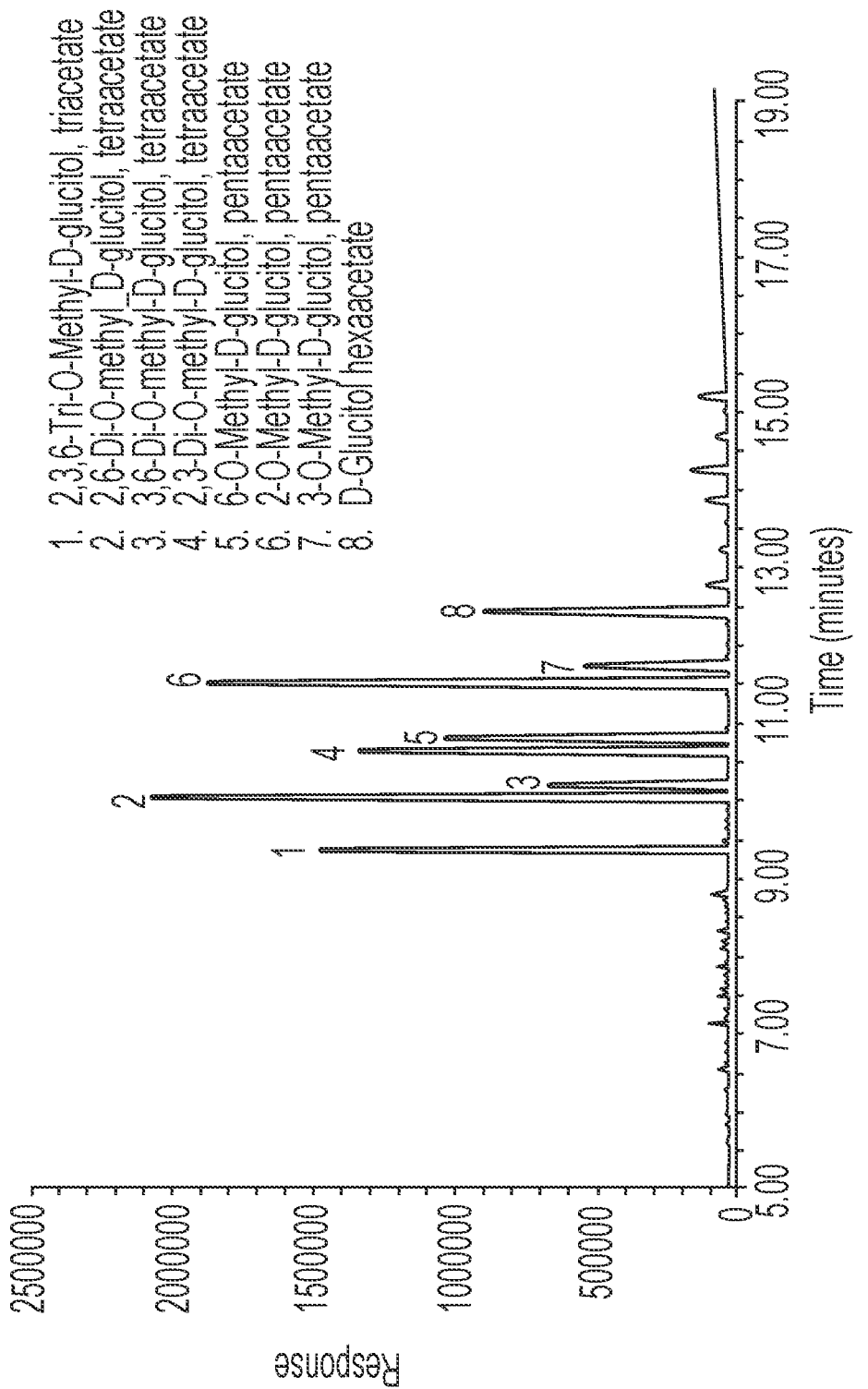

ABSORBENT ARTICLE COMPRISING A FRAGRANCE AND AN ODOR CONTROL COMPOSITION

CROSS REFERENCE TO RELATED APPLICATION

This application claims the benefit, under 35 USC 119(e), to U.S. Provisional Patent Application No. 63/406,718 filed on Sep. 15, 2022, which is herein incorporated by reference in its entirety.

TECHNICAL FIELD

This application generally relates to absorbent articles comprising aqueous-based odor control compositions and non-complexed perfume compositions, applied in patterns which do not substantially overlap, and methods of making the same.

BACKGROUND

The use of feminine hygiene pads to absorb body exudates has been known for decades. Improvements over the years have addressed the softness/feel of the pad against the skin of the wearer as well as the speed of fluid acquisition, retention of fluid acquisitions, and/or fluid capacity of these pads. Another area of improvement for feminine hygiene pads is in the area of odor control, as such articles are commonly used to absorb and retain bodily fluids and other exudates excreted by the human body, such as urine and menses. The degradation of menstrual fluid and/or urine commonly generates malodors. Therefore, materials for controlling and reducing malodors in absorbent articles have been developed.

Materials for controlling and reducing malodors in absorbent articles include non-complexed cyclodextrin molecules, which trap malodorant molecules by complexing them, thereby reducing their volatility. Additionally, odor controlling organic compounds, which play an active role in reducing the perception of malodors, are also known. Odor controlling organic compounds include fragrances (i.e., chemicals or blends of chemicals that stimulate the olfactory receptors providing a pleasant smell), odor masking compounds (i.e., compounds that stimulate the olfactory receptors so that unpleasant odors are perceived less or perceived as less disturbing), and reactive compounds (i.e., compounds that chemically react with and neutralize malodorant molecules). Such odor controlling organic compounds can be introduced into absorbent articles in the form of complexes with cyclodextrin.

Complexes of odor controlling organic compounds with cyclodextrin are beneficial because fragrances, odor masking compounds, and most reactive compounds tend to be volatile and evaporate during storage and use, thus losing efficacy. The formation of cyclodextrin complexes prevents the evaporation of such volatile compounds. In the context of reactive compounds, the formation of cyclodextrin complexes also protects the reactive compounds from unwanted reactions, thereby improving the chemical stability of these compounds during storage and usage of the absorbent articles. More recently, an aqueous-based odor control composition comprising a perfume complexed with methylated beta cyclodextrin (mBCD) has been shown to be particularly useful in absorbent articles. The aqueous-based composition provides several benefits, particularly versus a similar, organic solvent-based composition, including reduced complexity during manufacturing as well improved stability for the absorbent article.

By design, odor controlling organic compounds (e.g., perfumes) that are incorporated into absorbent articles in the form of cyclodextrin complexes are released from the cyclodextrin complexes upon contact with bodily fluids, such as menses and urine, to manage the malodors generated by the degradation of these fluids. Therefore, the odor controlling organic compounds (e.g., perfumes) in the cyclodextrin complexes are minimally perceptible prior to contact with the bodily fluids. However, some consumers may prefer to experience an initial perfume bloom—a "pre-scent"—prior to using the absorbent article (e.g., upon unpackaging the absorbent article), as well as during use. Furthermore, some consumers prefer for the pre-scent to have a different character than the scent provided during use. In order to provide a pre-scent that is different from the in-use scent, a non-complexed perfume composition and an odor control composition containing a perfume complexed with methylated beta cyclodextrin (mBCD) may be applied to the absorbent article, where the pre-scent associated with the non-complexed perfume composition is different than the scent associated with the odor control composition. However, the non-complexed perfume composition may interact adversely with odor control composition, due primarily to the presence of an organic solvent in the non-complexed perfume composition, and reduce the efficacy of the odor control composition.

Surprisingly, it has been found that application of a non-complexed perfume composition, which comprises a non-complexed perfume and an organic solvent, and an aqueous-based odor control composition, which comprises a perfume complexed with a methylated beta cyclodextrin (mBCD), to an absorbent article, in patterns that do not substantially overlap, provides an optimal scent benefit prior to and during use of the absorbent article.

SUMMARY

The present disclosure relates to a disposable absorbent article comprising a topsheet, a backsheet, and an absorbent core disposed between the topsheet and the backsheet, the disposable absorbent article further comprising: an aqueous-based odor control composition, which comprises a perfume complexed with a methylated beta-cyclodextrin, and a non-complexed perfume composition, which comprises non-complexed perfume and an organic solvent, where the odor control composition and the non-complexed perfume composition do not substantially overlap.

The present disclosure also relates to a method of making a disposable absorbent article having an aqueous-based odor control composition and a non-complexed perfume composition, the method comprising the steps of: obtaining a topsheet material; obtaining a backsheet material; obtaining an absorbent core material; placing the absorbent core material between the topsheet and the backsheet material; obtaining one or more optional materials which are disposed between the topsheet and the absorbent core and/or the absorbent core and the backsheet; providing an aqueous-based odor control composition, which comprises a perfume complexed with a methylated beta-cyclodextrin (m-BCD); providing a non-complexed perfume composition, which comprises a non-complexed perfume and an organic solvent; applying a pattern of the aqueous-based odor control composition to at least one of the topsheet, the backsheet, the absorbent core, or the optional materials and applying a pattern of the non-complexed perfume composition to at least one of the topsheet, the backsheet, the absorbent core, or the optional materials, wherein the odor control composition pattern and the non-complexed perfume composition pattern do not substantially overlap.

BRIEF DESCRIPTION OF THE DRAWINGS

FIG. 5 is a graph depicting a representative chromatogram of hydrolyzed, reduced, and acetylated methyl β-cyclodextrin.

Figure 1:
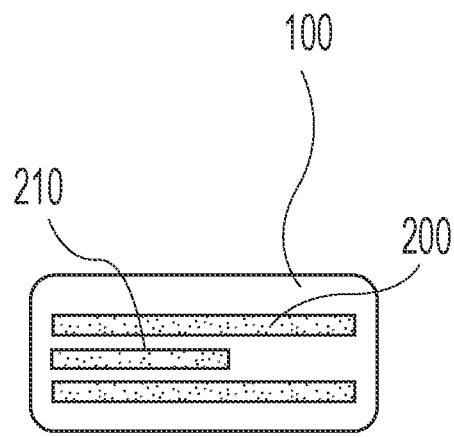
FIG. 1 is a schematic illustration of a top view of an absorbent core.

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION

As used herein, the following terms shall have the meaning specified thereafter:

"Absorbent article" refers to wearable devices, which absorb and/or contain liquid, and more specifically, refers to devices, which are placed against or in proximity to the body of the wearer to absorb and contain the various exudates discharged from the body. Absorbent articles can include diapers, training pants, adult incontinence undergarments (e.g., liners, pads and briefs) and/or feminine hygiene products.

The term "disposable" is used herein to describe absorbent articles which are not intended to be laundered or otherwise restored or reused as an absorbent article after a single use. Examples of absorbent articles include diapers, toddler training pants, adult incontinence pants, adult incontinence pads, and feminine hygiene products, such as sanitary napkins, pads, pantiliners, interlabial devices, hemorrhoid pads, and the like.

As used herein, "body-facing surface" means that surface of the article or component which is intended to be worn toward or adjacent to the body of the wearer, while the "garment-facing surface" is on the opposite side and is intended to be worn toward or placed adjacent to the wearer's undergarments, when the disposable absorbent article is worn.

"C log P" refers to calculated log P values, which is a measure of a compound's hydrophilicity, wherein log P is the octanol water partitioning coefficient as computed by the Consensus algorithm implemented in ACD/Percepta version 14.02 by Advanced Chemistry Development, Inc. (ACD/Labs, Toronto, Canada).

For "complex", it is intended to mean an "inclusion complex" within the meaning of IUPAC Compendium of Chemical Terminology 2nd Edition (1997), wherein the complexing agent (the cyclodextrin in this case) is the host and the complexed compound is the "guest".

"Cyclodextrin complex" refers to a complex of cyclodextrin and perfume.

"Cyclodextrin complex stability constant" or "complex stability constant" (log K) refers to the ability of a perfume raw material to bind to a cyclodextrin. The complex stability constant of a multitude of materials with respect to various cyclodextrins as measured by the calorimetry technique can be found in the literature, for example, Rekharsky and Inoue (1998), Complexation Thermodynamics of Cyclodextrins, Chemical Review, 98, 1875-1917. In addition, for reference, a list of perfume raw materials and their estimated complex stability constants is included in a chart below.

The terms "fragrance" and "perfume" can be used interchangeably.

"Molecular weight," unless otherwise designated, refers to the weight average molecular weight which can be calculated by using the sum of the molecular weights of the elements in a molecule. These can be found, for example, in Atomic Weights of the Elements, Weiser, 2005. "Odor Detection Threshold" refers to the lowest concentration in the air of a certain odor compound that is perceivable to the human sense of smell. The Odor detection Threshold of a multitude of materials can be found in vanGemert, L. J.; Odour Thresholds (Compilations of Odour Threshold Values in Air Water and Other Media; Oliemans Punter & Partners; The Netherlands, 2011. It is in units of –log molar concentration. In this context, human odor detection thresholds (ODTs) are expressed as olfactory power, or p.ol (the negative log of the molar concentration of the odorant in air at which a human first detects the presence of the odorant). These values can be directly transposed to other commonly used units such as ppm (volume) and ppb (volume): thresholds of 1 ppm and 1 ppb are equivalent to p.ol=6 and p.ol=9, respectively. Odor 30 Detection Threshold can be measured, for example, by the method in International Publication Number WO 2006/138726.

Absorbent Articles

In general, the absorbent articles of the present disclosure typically comprise a topsheet, a backsheet, and an absorbent core disposed between the topsheet and backsheet. Each of the non-complexed perfume composition and the aqueous-based odor control composition comprising a methylated beta-cyclodextrin (m-BCD) complex may be provided to an absorbent article in any suitable location or locations, provided that the non-complexed perfume composition does not substantially overlap with the odor control composition. Due primarily to the presence of organic solvent, non-complexed perfume composition may interact adversely with the aqueous-based odor control compositions and reduce the efficacy of the odor control compositions. Preferably, the non-complexed perfume composition is also applied to the absorbent article such that interaction with any inks or colorants in the absorbent article is also minimized.

Each of the non-complexed perfume composition and the aqueous-based odor control composition comprising a perfume complexed with methylated beta-cyclodextrin (m-BCD) may be applied in a variety of ways and in a variety of shapes or patterns, using conventional application equipment, for example, in the form of a spray. The application pattern may include a stripe(s), a circle(s), a dot(s), a geometric figure(s), a star(s), a decorative figure(s), an irregular shape(s), or a combination thereof. The pattern may comprise a single stripe, a single circle, a single dot, or a single other shape or multiple stripes, multiple circles, multiple dots, or multiple other shapes. Each of the non-complexed perfume composition and the aqueous-based odor control composition comprising a methylated beta-cyclodextrin (m-BCD) complex may be applied on the topsheet, on the absorbent core, on a body-facing side of the backsheet, and/or on any other layer of the within the article. In some embodiments, each of the non-complexed fragrance composition and the aqueous-based odor control composition may be applied on a body-facing or garment-facing side of the absorbent core and/or on a body-facing side of the backsheet. In some embodiments, the odor control composition and/or the non-complexed fragrance composition may be applied on more than one layer within the article.

In some embodiments, the non-complexed fragrance composition and the aqueous-based odor control composition may be applied on the same side of the same layer, e.g., both applied on the garment-facing side of the absorbent core. In such embodiments, the compositions are applied so as not to substantially overlap in the XY-plane—in particular, the area of the overlap region in the XY-plane is minimized. In some embodiments, the odor control composition and the non-complexed perfume composition may be applied on different layers or different sides of the same layer within the article. In such embodiments, the compositions are applied so as not to substantially overlap in the Z-plane—in particular, the caliper of the overlap region in the Z-plane is minimized. And, for simplicity, if the pattern of the odor control composition is applied at one location in the X-Y plane and the pattern of non-complexed perfume composition is applied at a separate, different location in the X-Y plane, the two patterns are seen as projected onto the same Z-plane (and the caliper of the overlap region in this Z-plane is measured).

When the non-complexed perfume composition and the aqueous-based odor control composition comprising a methylated beta-cyclodextrin (m-BCD) complex are applied on the same side of the same layer within the absorbent article, "substantially overlap" means that the area of the overlap region between the two compositions (in the XY-plane) is greater than about 50% of the wearer-facing surface area of the absorbent core, or greater than about 40% of the wearer-facing surface area of the absorbent core, or greater than about 30% of the of the body-facing surface area of the absorbent core, or greater than about 20% of the wearer-facing surface area of the absorbent core, or greater than about 10% of the wearer-facing surface area of the absorbent core, or greater than about 5% of the wearer-facing surface area of the absorbent core, or greater than about 3% of the wearer-facing surface area of the absorbent core, or greater than about 1% of the body-facing surface area of the absorbent core.

The area of the overlap region and the area of the body-facing surface of the absorbent core may be directly calculated from the manufacturer's specification of the absorbent article, including the relative placement of the non-complexed perfume composition pattern and the aqueous-based odor control composition pattern. If these specifications are not available (e.g., because a third party product is analyzed), the area of the overlap region and the area of the body-facing surface of the absorbent core can be measured on the product directly, e.g., with a ruler or using image analysis software. The area of the overlap region and the area of the body-facing surface of the absorbent core may be measured visually, with assistance of magnification/microscopy and/or photography or any other facilitating techniques and equipment, to any extent deemed useful. The area of the overlap region may then be divided by the area of the body-facing surface of the absorbent core and the result may be multiplied by 100, to express the result as a percentage. This procedure may be repeated for several (e.g., 3-5) individual articles having the same construction to obtain an average value of the area of the overlap region for a given article's construction.

For this purpose, the non-complexed perfume composition pattern, the aqueous-based odor control composition pattern, and the area of the overlap region may be visualized by using certain stains. The selection of an appropriate stain(s) to visualize (and distinguish) an organic solvent-based non-complexed perfume composition pattern versus an aqueous-based odor control composition pattern versus the overlap region is within the skill of one of ordinary skill in the art. The non-complexed perfume composition pattern, the aqueous-based odor control composition pattern, and overlap region may also be visualized (and distinguished) using various known analytical methods, including gas chromatography, IR spectroscopy, X-Ray Photoelectron Spectroscopy (XPS), and Time-of-Flight Secondary Ion Mass Spectroscopy (TOF-SIMS). These various analytical methods may be used with image analysis software in order to measure the area of the overlap region. SEM microscopy and FTIR imaging may also be used to visualize and/or measure the area of the overlap region.

When the non-complexed perfume composition and the aqueous-based odor control composition comprising a methylated beta-cyclodextrin (m-BCD) complex are applied on different layers or different sides of the same layer within the absorbent article, "substantially overlap" means that the caliper of the region of overlap of the two compositions (in the Z-plane) is greater than about 50% of the caliper of the layer(s) separating the two compositions, or greater than about 40% of the caliper of the layer(s) separating the two compositions, or greater than about 30% of the caliper of the layer(s) separating the two compositions, or greater than about 20% of the caliper of the layer(s) separating the two compositions, or greater than about 10% of the caliper of the layer(s) separating the two compositions, or greater than about 5% of the caliper of the layer(s) separating the two compositions, or greater than about 3% of the caliper of the layer(s) separating the two compositions, or greater than about 1% of the caliper of the layer(s) separating the two compositions.

The caliper of the overlap region may be directly calculated from the manufacturer's specification of the absorbent article, including the relative placement of the non-complexed perfume composition pattern and the aqueous-based odor control composition pattern. If these specifications are not available (e.g., because a third party product is analyzed), the caliper of the overlap region and the caliper of the layer(s) separating the two compositions can be measured on the product directly, e.g., with a ruler or using image analysis. The caliper of the region of overlap and the caliper of the layer(s) separating the two compositions may be measured visually (taking cross-section(s) of the absorbent article), with assistance of magnification/microscopy and/or photography or any other facilitating techniques and equipment, to any extent deemed useful. The caliper of the region of overlap may then be divided by the caliper of the layer(s) separating the two compositions and the result may be multiplied by 100, to express the result as a percentage. This procedure may be repeated for several (e.g., 3-5) individual articles having the same construction to obtain an average value of the caliper of the region of overlap for a given article's construction.

For this purpose, the non-complexed perfume composition pattern, the aqueous-based odor control composition pattern, and overlap region may be visualized by using certain stains. The selection of an appropriate stain(s) to visualize (and distinguish) an organic solvent-based non-complexed perfume composition pattern versus an aqueous-based odor control composition pattern versus the overlap region is within the skill of one of ordinary skill in the art. The non-complexed perfume composition pattern, the aqueous-based odor control composition pattern, and the overlap region may also be visualized (and distinguished) using various known analytical methods, including gas chromatography, IR spectroscopy, X-Ray Photoelectron Spectroscopy (XPS), and Time-of-Flight Secondary Ion Mass Spectroscopy (TOF-SIMS). These various analytical methods may be combined with image analysis software in order to measure the caliper of the overlap region. SEM microscopy and FTIR imaging may also be used to visualize and/or measure the caliper of the overlap region.

Figure 2:
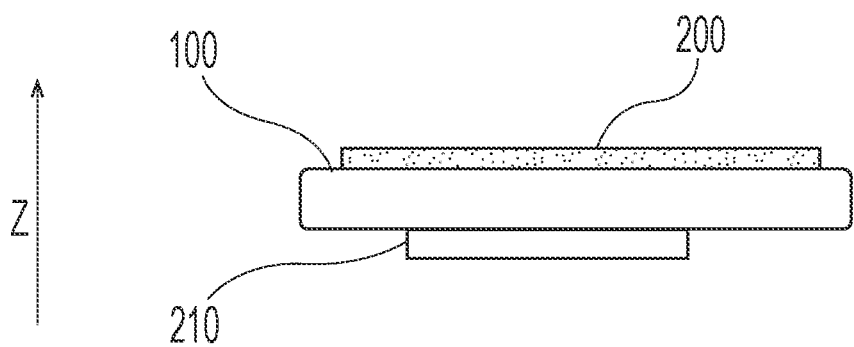
FIG. 2 is a schematic illustration of a cross-sectional view of an absorbent core.
Figure 3:
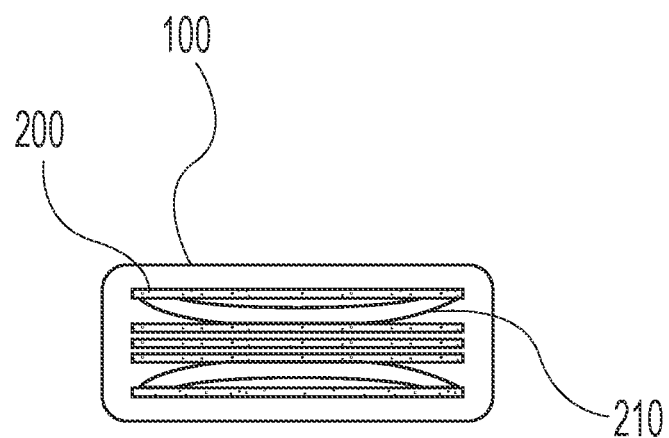
FIG. 3 is a schematic illustration of a top view an absorbent core.

Turning to the drawings, FIG. 1 shows an aqueous-based odor control composition pattern comprising two stripes and a non-overlapping, non-complexed perfume composition pattern comprising one stripe. As shown in FIG. 1, the non-complexed perfume composition pattern 210 and the aqueous-based odor control composition pattern 200 are both disposed on the garment-facing side of the absorbent core 100, without overlapping in the XY-plane. As shown in FIG. 2, the non-complexed perfume composition pattern 210 is disposed on the garment-facing side of the absorbent core 100, while the aqueous-based odor control composition pattern 200 is disposed on the body-facing side of the absorbent core 100, without overlapping in the Z-plane. FIG. 3 shows an aqueous-based odor control composition pattern 200 comprising five straight stripes and a non-complexed perfume composition pattern 210 comprising two curved stripes, both patterns disposed on the body-facing side of the absorbent core 100. Notably, the non-complexed perfume composition pattern 210 shown in FIG. 3—two curved stripes—may be due to migration of the non-complexed perfume composition or the non-complexed perfume composition may have been applied as two curved stripes during manufacture. As shown in FIG. 3, the two patterns overlap but the area of overlap is less than 30% of the body-facing surface area of the absorbent core, in accordance with the present disclosure.

Figure 4:
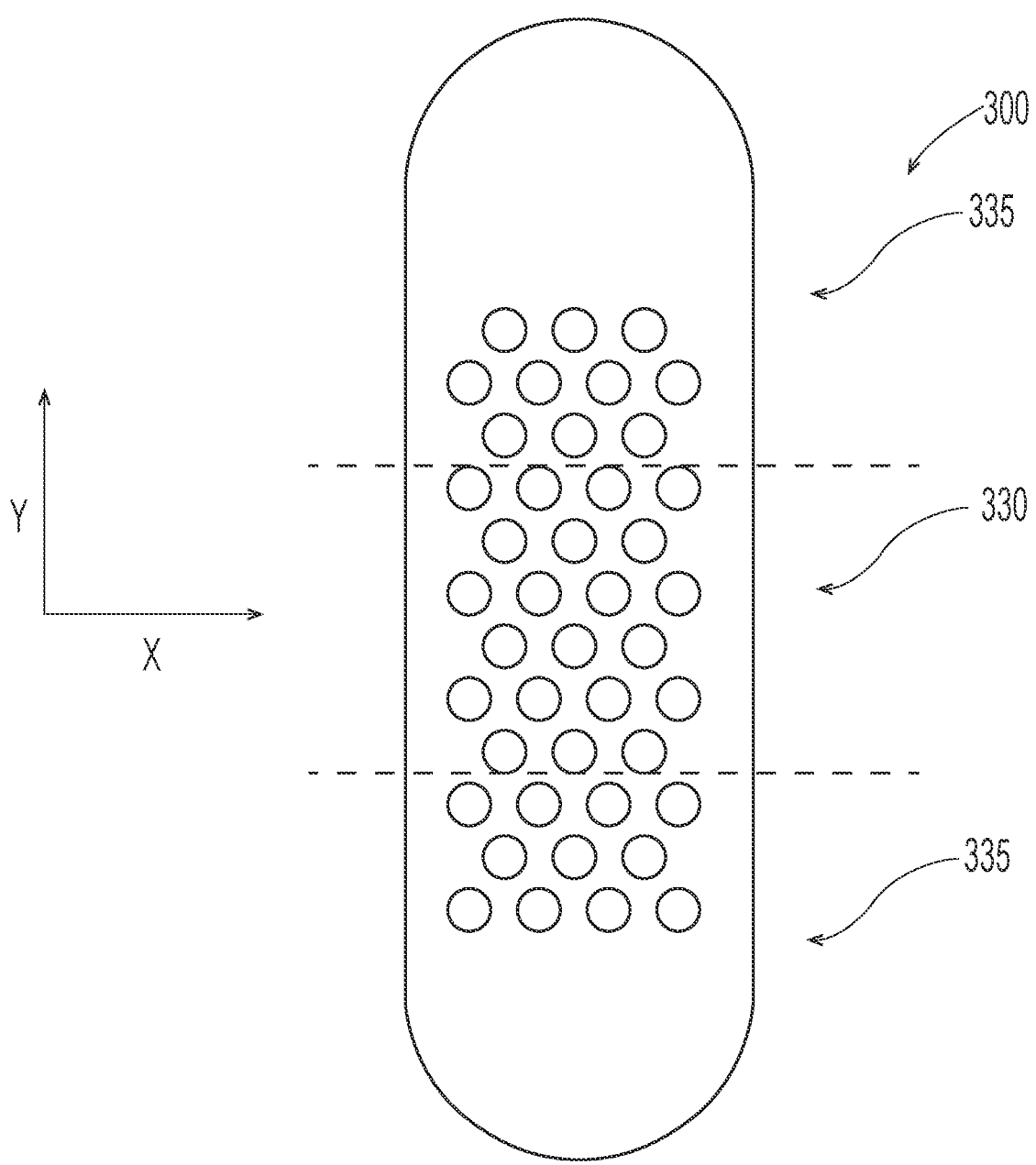
FIG. 4 is a schematic illustration of an absorbent article.

With regard to the aqueous-based odor control composition, as discussed above, when the absorbent article is wetted by liquid insult, the substituted cyclodextrin in the odor control composition releases the perfume therein to help mask any odors of the liquid insult. As such, the aqueous-based odor control composition may be placed in the article where it has access to liquid insults. In some embodiments, the aqueous-based odor control composition, which comprises the substituted cyclodextrin complex (e.g. mBCD), may be provided in a target zone of an absorbent article. As shown in FIG. 4, the target zone 330 of an absorbent article 300 represents the area of the absorbent article of expected fluid insult. The absorbent article 300 is shown having an overall longitudinal length generally parallel to a Y-axis and an overall lateral width generally parallel to an X-axis.

As shown in FIG. 4, the target zone 330 may be disposed between two outer zones 335. In some forms, the target zone 330 may comprise about 60 percent of the overall longitudinal length (along a Y-axis) of the absorbent article 300 where each of the outer zones comprise about 30 percent or less of the overall length or less of the absorbent article 300. In some forms, the target zone 330 may comprise about 50 percent of the overall length while the outer zones 335 comprise about 40 percent or less of the overall length of the absorbent article. In some forms, the target zone 330 may extend from about more than 20 percent to less than about 80 percent, more than about 30 percent to less than about 70 percent, more than about 40 percent to less than about 60 percent of the overall length of the absorbent article 300, specifically including all values within these ranges and any ranges created thereby.

Forms are contemplated where the target zone 300 extends along only a portion of the overall lateral width (along an X-axis) of the absorbent article 300. For example, in some forms, the target zone 330 may extend for less than about 90 percent of the overall width of the absorbent article 300. As another example, the target zone 330 may extend for less than about 75 percent of the overall width of the absorbent article 300. Still in other forms, the target zone 330 may extend for less than about 50 percent of the overall width of the absorbent article 300. As yet another example, the target zone 330 may extend for about more than 10 percent to less than about 90 percent, more than about 20 percent to less than about 80 percent, more than about 30 percent to less than about 70 percent of the overall width, specifically including all values within these ranges and any ranges created thereby. In such forms, areas of the article outside of the target zone 330 may be sans the substituted cyclodextrin complex. Or in other forms, the target zone 330 may comprise more substituted cyclodextrin complex than either of the outer zones 335.

In the case of catamenial tampons the substituted cyclodextrin complex can be present on or in any component of the tampon, including the absorbent compressed pledget forming the tampon body, the overwrap, and the extraction cord. For example, it can be comprised in the tampon body, or on the tampon surface or, if an overwrap is present, on either surface of the overwrap. In case a secondary mass of absorbent material is present along the extension cord proximal to the extraction end of the tampon, the substituted cyclodextrin complex can be comprised within this secondary mass.

Components of Absorbent Article

Regarding the specific components of the absorbent article, the topsheet is preferably compliant, soft feeling, and non-irritating to the wearers skin and hair. Further, the topsheet is liquid pervious, permitting liquids (e.g., menses and/or urine) to readily penetrate through its thickness. A suitable topsheet may be manufactured from a wide range of materials such as woven and nonwoven materials (e.g., a nonwoven web of fibers), polymeric materials such as apertured formed thermoplastic films, apertured plastic films, and hydroformed thermoplastic films, porous foams, reticulated foams, reticulated thermoplastic films; and thermoplastic scrims. Suitable woven and nonwoven materials can be comprised of natural fibers (e.g., wood or cotton fibers), synthetic fibers (e.g., polymeric fibers such as polyester, polypropylene, or polyethylene fibers) or from a combination of natural and synthetic fibers. When the topsheet comprises a nonwoven web, the web may be manufactured by a wide number of known techniques. For example, the web may be spunbonded, carded, wet-laid, melt-blown, hydroentangled, combinations of the above, or the like.

In some forms, the topsheet may be a laminate of two or more materials, e.g. including a nonwoven and a film. In such forms, the nonwoven may form a body-facing surface of the topsheet. Or the film may form at least a portion of the body-facing surface of the topsheet. Films for use as topsheets are discussed in U.S. Pat. Nos. 4,629,643; 5,460,623; and 6,563,013. Additional examples of formed films suitable for use as a topsheet or a portion thereof are described in U.S. Pat. No. 3,929,135, issued to Thompson on Dec. 30, 1975; U.S. Pat. No. 4,324,246, issued to Mullane et al. on Apr. 13, 1982; U.S. Pat. No. 4,342,314, issued to Radel et al. on Aug. 3, 1982; U.S. Pat. No. 4,463,045, issued to Ahr et al. on Jul. 31, 1984; U.S. Pat. No. 5,006,394, issued to Baird on Apr. 9, 1991; U.S. Pat. No. 4,609,518, issued to Curro et al. on Sep. 2, 1986; and U.S. Pat. No. 4,629,643, issued to Curro et al. on Dec. 16, 1986.

Nonlimiting examples of woven and nonwoven materials suitable for use as the topsheet or a portion thereof include fibrous materials made from natural fibers, modified natural fibers, synthetic fibers, or combinations thereof. These fibrous materials can be either hydrophilic or hydrophobic, but it is preferable that the topsheet be hydrophobic or rendered hydrophobic. Some suitable nonwoven materials suitable for use as a topsheet are described in U.S. Pat. Nos. 5,792,404 and 5,665,452.

The backsheet can be impervious to liquids (e.g., menses and/or urine) and can be preferably manufactured from a thin plastic film, although other flexible materials may also be used such as nonwovens. As used herein, the term "flexible" refers to materials which are compliant and will readily conform to the general shape and contours of the human body. The backsheet can prevent the exudates absorbed and contained in the absorbent core from wetting articles which contact the absorbent article such as bedsheets, pants, pajamas and undergarments. The backsheet can also be vapor permeable ("breathable"), while remaining fluid impermeable. The backsheet may comprise a woven or nonwoven material, polymeric films such as thermoplastic films of polyethylene or polypropylene, or composite materials such as a film-coated nonwoven material.

The backsheet can comprise panty fastening means applied on its surface, particularly the surface facing outside the absorbent article in order to allow the article to stay in place when worn between the user's crotch and panties. Such panty fastening means can be for example a layer of adhesive or mechanical means such as Velcro® or combination thereof. When an adhesive is present, typically a release paper is also present in order to protect the adhesive before use.

The backsheet and the topsheet can be positioned respectively adjacent the garment surface and the body surface of the absorbent core. The absorbent core can be joined with the topsheet, the backsheet, or both in any manner as is known by attachment means, such as those well known in the art. Embodiments of the present invention are envisioned wherein portions of the entire absorbent core are unattached to either the topsheet, the backsheet, or both.

The absorbent core can be formed from any of the materials well known to those of ordinary skill in the art. Examples of such materials include multiple plies of creped cellulose wadding, fluffed cellulose fibers, wood pulp fibers also known as airfelt, textile fibers, a blend of fibers, a mass or batt of fibers, airlaid webs of fibers, a web of polymeric fibers, and a blend of polymeric fibers. Other suitable absorbent core materials include absorbent foams such as polyurethane foams or high internal phase emulsion ("HIPE") foams. Suitable HIPE foams are disclosed in U.S. Pat. Nos. 5,550,167; 5,387,207; 5,352,711; and 5,331,015. Other suitable materials for use in absorbent cores comprise open celled foams or pieces thereof. The use of foams in absorbent cores is described in additional detail in U.S. Pat. Nos. 6,410,820; 6,107,356; 6,204,298; 6,207,724; 6,444,716; 8,211,078; and 8,702,668.

In some forms, the absorbent core structure may comprise a heterogeneous mass layer or may utilize methods or parameters such as those described in U.S. patent application Ser. No. 14/715,984, filed May 19, 2015; U.S. patent application Ser. No. 14/750,399, Jun. 25, 2015; U.S. patent application Ser. No. 14/751,969 filed Jun. 26, 2015; U.S. patent application Ser. No. 15/078,132 filed Mar. 23, 2016; U.S. patent application Ser. No. 14/750,596 filed Jun. 25, 2015; U.S. patent application Ser. No. 15/084,902 filed Mar. 30, 2016; U.S. patent application Ser. No. 15/343,989 filed Nov. 4, 2016; U.S. patent application Ser. No. 15/344,273 filed Nov. 4, 2016; U.S. patent application Ser. No. 15/344,294 filed Nov. 4, 2016; U.S. patent application Ser. No. 14/704,110 filed May 5, 2015; U.S. patent application Ser. No. 15/194,894 filed Jun. 28, 2016; U.S. patent application Ser. No. 15/344,050 filed Nov. 4, 2016; U.S. patent application Ser. No. 15/344,117 filed Nov. 4, 2016; U.S. patent application Ser. No. 15/344,177 filed Nov. 4, 2016; U.S. patent application Ser. No. 15/344,198 filed Nov. 4, 2016; U.S. patent application Ser. No. 15/344,221 filed Nov. 4, 2016; U.S. patent application Ser. No. 15/344,239 filed Nov. 4, 2016; U.S. patent application Ser. No. 15/344,255 filed Nov. 4, 2016; U.S. patent application Ser. No. 15/464,733 filed Nov. 4, 2016; U.S. Provisional Patent Application No. 62/437,208 filed Dec. 21, 2016; U.S. Provisional Patent Application No. 62/437,225 filed Dec. 21, 2016; U.S. Provisional Patent Application No. 62/437,241 filed Dec. 21, 2016; or U.S. Provisional Patent Application No. 62/437,259 filed Dec. 21, 2016. The heterogeneous mass layer has a depth, a width, and a height.

In some forms, a combination of absorbent core materials may be utilized. For example, forms are contemplated where a first layer of an absorbent core comprises a foam material or pieces thereof as described previously, and a second layer of an absorbent core comprises an airlaid material. Such combinations are described in U.S. Patent Publication No. 2014/0336606 and U.S. Pat. No. 9,649,228.

For some absorbent articles, the absorbent core can be relatively thin, less than about 5 mm in thickness, or less than about 3 mm, or less than about 1 mm in thickness. Thickness can be determined by measuring the thickness at the midpoint along the longitudinal centerline of the pad by any means known in the art while under a uniform pressure of 1.72 kPa.

The absorbent core can comprise superabsorbent materials such as absorbent gelling materials (AGM), including AGM fibers, as is known in the art. The absorbent core can therefore constitute a layer comprising superabsorbent material.

The absorbent article can comprise other additional components, for example between the topsheet and absorbent core, such as a secondary topsheet or acquisition layer. The secondary topsheet or acquisition layer can comprise a tissue layer or a nonwoven, such as carded resin-bonded nonwovens, embossed carded resin-bonded nonwovens, high-loft carded resin-bonded nonwovens, carded through-air bonded nonwovens, carded thermo-bonded nonwovens, spunbonded nonwovens, and the like. A variety of fibers can be used in the secondary topsheet or acquisition layer, including natural fibers, e.g., wood pulp, cotton, wool, and the like, as well as biodegradable fibers, such as polylactic acid fibers, and synthetic fibers such as polyolefins (e.g., polyethylene and polypropylene), polyesters, polyamides, synthetic cellulosics (e.g., RAYON®, Lyocell), cellulose acetate, bicomponent fibers, and blends thereof. The basis weight of the secondary topsheet or acquisition layer can vary depending upon the desired application. In some forms, the secondary topsheet or acquisition layer may comprise a super absorbent polymer, e.g. AGM deposited thereon. In such forms, the secondary topsheet or acquisition layer may comprise a first AGM while the absorbent core comprises a second AGM. In some forms, the first AGM may be different than the second AGM.

The absorbent article can comprise further components such as side cuffs, typically found in diapers, or side wings or side flaps, typically found in sanitary napkins.

Absorbent catamenial tampons are absorbent articles for internal use in the vagina which are typically made by a pledget comprising absorbent fibers compressed to a cylindrical shape. Tampons can be "digital tampons" when they have a self-sustaining shape and can be inserted with a finger or "applicator tampons" i.e., tampons which are introduced using an applicator. Tampons can also comprise an extraction cord so to facilitate extraction from the vagina.

Absorbent hygienic articles herein are often commercialized in packages containing a plurality of units, often the package is a plastic film or a carton box. Single units contained within the commercial package can be individually packaged or not.

In some forms, the absorbent articles of the present disclosure may comprise additional layers disposed between the topsheet and the absorbent core and/or between the absorbent core and the backsheet. Some examples include a secondary topsheet, acquisition layer, and/or distribution layer which can be disclosed between the topsheet and the absorbent core. Other examples include distribution layers or liquid-impermeable layers which are disposed between the absorbent core and the backsheet.

Application of Odor Control Composition

As stated previously, the odor control composition of the present disclosure can be provided in any suitable location or locations on a disposable absorbent article. However, it is believed that for those processes which involve spraying of the odor control complex onto one or more layers of the disposable absorbent article, can lead to contamination where the odor control complex is applied to some layers. For example, topsheets, as they are designed for quick fluid acquisition, may be permeable to such an extent that when spraying the odor control composition onto the topsheet, a portion of the odor control composition may pass through the topsheet onto the production equipment thereby causing contamination of the production line. Similarly, secondary topsheets may be designed such that they are permeable to such an extent that a portion of the sprayed odor control composition would blow through the secondary topsheet.

In contrast, the absorbent core is often the densest layer of the disposable absorbent article. It is therefore believed that where the aqueous-based odor control composition is sprayed onto the absorbent core, there is a much lower likelihood of a portion of the odor control composition blowing through the layer. So, in some forms, the aqueous-based odor control composition of the present disclosure may be provided on the absorbent core.

It is worth noting that additional optional layers may be provided between the topsheet and the absorbent core and/or between the backsheet and the absorbent core. So, the aqueous odor control composition of the present disclosure may be applied to one or more of the layers that make up the disposable absorbent article.

Other mechanisms of application of the odor control composition are contemplated. Additionally, the odor control composition of the present disclosure may be applied to AGM in the absorbent core as disclosed in US2018/033515. Additionally, where manufacturers of absorbent articles obtain webs of material from suppliers, the provision of the odor control composition may be provided by the supplier of the material. For example, an absorbent core supplier may apply the odor control composition to the absorbent core raw material. The absorbent core raw material may then be subsequently converted by the absorbent article manufacturer. Independently or in conjunction therewith, topsheet suppliers, secondary topsheet suppliers, or other raw material suppliers may apply the odor control composition of the present disclosure to raw materials for subsequent converting into absorbent articles.

The odor control composition of the present disclosure is aqueous during application to the disposable absorbent article and/or the layers which make up the disposable absorbent article. Disposable absorbent article manufacturers may obtain the aqueous odor control composition from a supplier, or the manufacturer may produce the odor control composition themselves.

Odor Control Composition

The odor control composition of the present disclosure is an aqueous-based composition and comprises a perfume complexed with a methylated beta cyclodextrin (mBCD), an optional cyclodextrin compatible surfactant, and an optional preservative. The odor control composition of the present disclosure allows for reduced complexity during manufacturing as well as reduced risk of use during manufacturing. Moreover, the inventors have surprisingly found that the odor control composition of the present disclosure provided better stability for the disposable absorbent article. It was discovered that disposable absorbent articles comprising a visual signal (colorant disposed on a layer of the disposable absorbent article), and conventional odor control compositions (e.g., organic solvent-based odor control compositions), had an increased likelihood of having their visual signal change appearance due to the odor control composition. However, with the odor control composition of the present disclosure, the visual signals, even over time, remain intact. Additionally, it was similarly discovered that conventional odor control compositions would similarly negatively impact inks disposed on packaging material. For example, inks disposed on a consumer-facing surface of the package material could change in appearance due to the presence of a conventional odor control composition on articles within the package material.

Perfume

The odor control composition comprises a perfume, which is complexed with the methylated β-cyclodextrin (also referred to as the "complexed perfume composition"). At least a portion of the perfume raw materials may have a complex stability constant of about 3.0 or less; about 2.5 or less, about 2.0 or less, about 1.0 or less, to about 0, to about −1, to about −2, or any combination thereof. Some of the perfume raw materials may have a c Log P of about 2.5 or less, about 2.0 or less, about 1.5 or less, about 1.0 or less, to about −3. Some of the perfume raw materials may have a weight average molecular weight of about 200 Daltons or less, about 180 Daltons or less, about 150 Daltons or less, about 100 Daltons or less, to about 50 Daltons. A perfume raw material will have an odor detection threshold. At least a portion of the perfume raw materials will have an odor detection threshold of about 7-log molar concentration or greater; about 8-log molar concentration or greater; about 9-log molar concentration or greater; to about 11.5-log molar concentration. The complexed perfume composition comprises about 10% or more, by weight of the composition, of perfume raw materials which have a complex stability constant of about 3.0 or less, a c Log P of about 2.5 or less, and a weight average molecular weight of about 200 Daltons or less. The complexed perfume composition may comprise about 20% or more, about 30% or more, about 40% or more, or about 50% or more, up to 100%, of perfume raw materials which have a complex stability constant of about 3.0 or less, a c Log P of about 2.5 or less, and a weight average molecular weight of about 200 Daltons or less. In addition, the complexed perfume composition may also include perfume raw materials with odor detection thresholds of about 7-log molar concentration. A representative, non-limiting, list of perfume raw materials that have a complex stability constant of about 3.0 or less, a c Log P of about 2.5 or less, and a weight average molecular weight of about 200 Daltons or less is included in the Table 1 below.

| CAS Number | Name | LogP (v3.0) | Formula Weight | Odor Detection Threshold, Neural Net model | bCD Complex Stability Constant |
|---|---|---|---|---|---|
| 10031-96-6 | eugenyl formate | 2.35 | 192.21 | 8.84 | 2.71 |
| 100-52-7 | Benzaldehyde | 1.4 | 106.12 | 7.45 | 2.19 |
| 10094-40-3 | 2-hexen-1-yl acetate | 2.21 | 142.20 | 8.20 | 1.45 |
| 101-39-3 | alpha-methyl cinnamaldehyde | 2.18 | 146.19 | 8.83 | 1.08 |
| 101-41-7 | Methyl phenylacetate | 1.89 | 150.18 | 8.02 | 2.14 |
| 101-48-4 | Viridine (PADMA) | 1.65 | 166.22 | 8.01 | 2.26 |
| 101-97-3 | Ethyl 2-phenylacetate | 2.39 | 164.20 | 8.63 | 2.25 |
| 103-25-3 | methyl hydrocinnamate | 2.04 | 164.20 | 8.20 | 2.24 |
| 103-26-4 | Methyl cinnamate | 2.44 | 162.19 | 8.97 | 2.07 |
| 103-45-7 | 2-Phenylethyl acetate | 2.07 | 164.20 | 8.15 | 1.54 |
| 103-54-8 | Cinnamyl acetate | 2.49 | 176.22 | 8.51 | 1.53 |
| 104-09-6 | lilac acetaldehyde | 2.12 | 134.18 | 9.36 | 2.67 |
| 104-20-1 | 4-(p-Methoxyphenyl)-2-butanone (frambinone) | 1.88 | 178.23 | 8.86 | 1.72 |
| 104-46-1 | Anethole | 2.43 | 148.20 | 8.79 | 2.34 |
| 104-50-7 | gamma-Octalactone | 2.06 | 142.20 | 8.30 | 2.94 |
| 104-53-0 | 3-phenyl propionaldehyde | 1.65 | 134.18 | 8.95 | 2.47 |
| 104-54-1 | Cinnamic alcohol | 1.68 | 134.18 | 8.58 | 2.15 |
| 104-55-2 | Cinnamic aldehyde | 1.92 | 132.16 | 8.56 | 2.37 |
| 104-62-1 | Phenethyl formate | 1.82 | 150.18 | 8.10 | 2.32 |
| 104-64-3 | 3-phenyl propyl formate | 2.22 | 164.20 | 8.51 | 2.46 |
| 105-01-1 | Isobutyl furylpropionate | 2.34 | 196.25 | 8.60 | 2.30 |
| 10521-96-7 | Styryl acetate | 2.3 | 162.19 | 8.60 | 1.47 |
| 105-86-2 | geranyl formate | 2.44 | 182.26 | 8.49 | −1.85 |
| 10606-47-0 | 3-Hepten-1-ol | 1.79 | 114.19 | 8.47 | 2.11 |
| 106-22-9 | Citronellol | 2.49 | 156.27 | 8.37 | −0.64 |
| 106-24-1 | trans-Geraniol | 1.95 | 154.25 | 9.36 | −2.13 |
| 106-25-2 | Nerol | 1.95 | 154.25 | 9.36 | −2.13 |
| 106-26-3 | Neral | 2.33 | 152.24 | 8.48 | −1.82 |
| 106-72-9 | melon heptenal (melonal) | 2.09 | 140.23 | 8.09 | −0.64 |
| 107-03-9 | Propyl mercaptan | 1.87 | 76.16 | 9.04 | 0.65 |
| 1073-26-3 | 2-Propionylpyrrole | 1.37 | 123.15 | 8.13 | 1.88 |
| 110458-85-0 | 5,6-Dimethyl-1-(1-methylethenyl)bicyclo[2.2.1]hept-5-ene-2-methanol | 2.36 | 192.30 | 9.46 | 1.27 |
| 1123-85-9 | Hydratopic alcohol | 1.85 | 136.19 | 8.19 | 1.99 |
| 1131-62-0 | 3,4-Dimethoxyacetophenone | 1.7 | 180.20 | 8.15 | 1.63 |
| 116-26-7 | Safranal | 2.4 | 150.22 | 8.54 | 1.30 |
| 118-93-4 | 2-Hydroxyacetophenone | 1.97 | 136.15 | 8.15 | 1.38 |
| 1197-06-4 | cis-carveol | 1.86 | 152.24 | 8.60 | 0.32 |
| 1205-17-0 | ocean propanal (helional) | 1.77 | 192.21 | 8.89 | 2.67 |
| 120-58-1 | Isosafrol | 2.01 | 162.19 | 8.45 | 2.52 |
| 120-72-9 | Indole | 2.34 | 117.15 | 8.20 | 2.19 |
| 120-75-2 | 2-Methylbenzothiazole | 2.14 | 149.21 | 8.12 | 2.83 |
| 121-32-4 | Ethyl vanillin | 1.53 | 166.18 | 10.32 | 2.41 |
| 121-33-5 | Vanillin | 1.04 | 152.15 | 9.93 | 2.36 |
| 121-98-2 | Methyl p-anisate | 1.99 | 166.18 | 8.54 | 2.05 |
| 122-63-4 | Benzyl propionate | 2.24 | 164.20 | 8.29 | 2.01 |
| 122-72-5 | 3-phenyl propyl acetate | 2.48 | 178.23 | 8.70 | 1.73 |
| 122-78-1 | phenyl acetaldehyde | 1.46 | 120.15 | 8.40 | 2.30 |
| 123-08-0 | p-Hydroxybenzaldehyde | 1.29 | 122.12 | 9.34 | 2.28 |
| 123-11-5 | para-anisaldehyde | 1.53 | 136.15 | 7.72 | 2.29 |
| 123-92-2 | Isoamyl acetate | 1.87 | 130.19 | 7.12 | 1.33 |
| 13327-56-5 | Ethyl 3-methylthiopropionate | 1.47 | 148.22 | 8.09 | 1.88 |
| 134-20-3 | Methyl anthranilate | 1.58 | 151.17 | 8.22 | 1.69 |
| 13494-08-1 | 1,2-Cyclopentanedione, 3-ethyl- | 0.5 | 126.16 | 8.29 | 2.72 |
| 134-96-3 | Syringaldehyde | 0.94 | 182.18 | 9.89 | 2.48 |
| 13678-68-7 | furfuryl thioacetate | 1.09 | 156.20 | 8.11 | 1.33 |
| 13679-85-1 | blackberry thiophenone | 0.73 | 116.18 | 8.44 | 2.06 |
| 140-39-6 | p-Cresyl acetate | 2.17 | 150.18 | 8.10 | 1.67 |
| 14049-11-7 | linalool oxide (pyranoid) | 1.89 | 170.25 | 8.45 | 2.62 |
| 141-27-5 | Geranial | 2.33 | 152.24 | 8.48 | −1.82 |
| 142653-61-0 | Parmanyl | 1.75 | 153.22 | 8.13 | 2.05 |

-continued

| CAS Number | Name | LogP (v3.0) | Formula Weight | Odor Detection Threshold, Neural Net model | bCD Complex Stability Constant |
|---|---|---|---|---|---|
| 142-83-6 | Sorbinaldehyde | 1.29 | 96.13 | 8.57 | 2.29 |
| 14360-50-0 | Pentyl 2-furyl ketone | 2.49 | 166.22 | 9.39 | 2.44 |
| 150-19-6 | m-Guaiacol | 1.39 | 124.14 | 8.16 | 2.02 |
| 1504-55-8 | alpha-Methylcinnamic alcohol (cypriol) | 1.73 | 148.20 | 8.68 | 0.74 |
| 15111-56-5 | Ethyl cyclohex-3-enecarboxylate | 1.86 | 154.21 | 8.47 | 2.78 |
| 1516-17-2 | 2,4-Hexadienyl acetate | 1.75 | 110.16 | 8.30 | 1.36 |
| 15174-69-3 | 4-Hydroxy-3-methylbenzaldehyde | 1.63 | 136.15 | 10.25 | 2.24 |
| 15186-51-3 | Furan, 3-methyl-2-(3-methyl-2-butenyl)- | 2.04 | 150.22 | 8.26 | −0.46 |
| 1540-28-9 | n-Pentyl acetoacetate | 1.63 | 172.22 | 8.04 | 1.79 |
| 1552-67-6 | Ethyl 2-hexenoate | 2.49 | 142.20 | 8.30 | 2.12 |
| 15679-12-6 | 2-Ethyl-4-methylthiazole | 1.69 | 127.20 | 8.31 | 2.13 |
| 15679-13-7 | tropical thiazole | 2.12 | 141.23 | 8.25 | 2.33 |
| 16251-77-7 | Trifernal | 2.28 | 148.20 | 8.87 | 2.51 |
| 1646-26-0 | Coumarone | 1.9 | 160.17 | 8.64 | 1.90 |
| 16491-25-1 | 2,4-Hexadienyl propionate | 2.44 | 154.21 | 8.72 | 1.97 |
| 1679-07-8 | Cyclopentyl mercaptan | 2.24 | 102.19 | 9.09 | 1.47 |
| 1679-09-0 | 2-Methyl-2-butanethiol | 2.45 | 104.21 | 9.16 | 0.79 |
| 16957-70-3 | trans-2-Methyl-2-pentenoic acid (Strawberriff) | 1.33 | 114.14 | 8.78 | 0.65 |
| 1708-34-5 | 2-Hexyl-1,3-dioxolane | 2.17 | 158.24 | 8.11 | 2.56 |
| 1708-81-2 | cis-3-Hepten-1-ol | 1.79 | 114.19 | 8.47 | 2.11 |
| 1708-82-3 | 3-Hexenyl acetate | 2.18 | 142.20 | 8.16 | 1.48 |
| 17102-64-6 | Trans,trans-2,4-Hexadien-1-01 | 0.96 | 98.14 | 8.22 | 2.06 |
| 1754-62-7 | Methyl Trans-Cinnamate, 99% | 2.44 | 162.19 | 8.97 | 2.07 |
| 1759-28-0 | 4-Methyl-5-vinylthiazole | 1.51 | 125.19 | 8.56 | 1.62 |
| 17626-75-4 | 2-Propylthiazole | 1.51 | 127.20 | 8.23 | 1.79 |
| 18031-40-8 | (S),(−)-Perillaaldehyde | 2.34 | 150.22 | 9.80 | 1.85 |
| 18277-27-5 | 2-(1-Methylpropyl)thiazole | 1.9 | 141.23 | 8.25 | 1.71 |
| 18479-68-0 | (+)-P-Menth-1-en-9-ol, 97%, mixture of isomers | 2.26 | 154.25 | 8.87 | 1.66 |
| 18640-74-9 | Isobutyl thiazole | 1.92 | 141.23 | 8.29 | 2.02 |
| 18829-55-5 | trans-2-Heptenal | 2.1 | 112.17 | 8.76 | 2.33 |
| 18881-04-4 | (1S)-(−)-cis-Verbenol | 2.03 | 152.24 | 8.09 | 2.61 |
| 189440-77-5 | Anapear | 2.3 | 154.21 | 8.78 | 2.20 |
| 1901-38-8 | alpha-Campholenic alcohol | 2.03 | 154.25 | 8.08 | 1.32 |
| 19788-49-9 | Ethyl 2-mercaptopropionate | 1.41 | 134.19 | 8.39 | 0.99 |
| 19819-98-8 | 2-Methylphenethyl alcohol | 1.66 | 136.19 | 8.46 | 2.36 |
| 2046-17-5 | Methyl 4-phenylbutyrate | 2.46 | 178.23 | 8.75 | 2.37 |
| 20474-93-5 | Allyl crotonate | 1.63 | 126.16 | 8.29 | 2.24 |
| 2051-78-7 | Allyl butyrate | 1.88 | 128.17 | 8.17 | 2.21 |
| 2051-96-9 | Benzyl lactate | 1.35 | 180.20 | 8.15 | 1.70 |
| 20665-85-4 | Vanillin isobutyrate | 1.92 | 222.24 | 8.20 | 2.20 |
| 2111-75-3 | perillaldehyde | 2.34 | 150.22 | 9.80 | 1.85 |
| 2142-94-1 | Neryl Formate | 2.44 | 182.26 | 8.49 | −1.85 |
| 2179-58-0 | Allyl methyl disulfide | 1.9 | 120.23 | 8.59 | 1.44 |
| 2179-60-4 | Methyl propyl disulfide | 2.28 | 122.24 | 8.56 | 1.97 |
| 21835-00-7 | 2-Cyclopenten-1-one, 2-hydroxy-3,4-dimethyl- | −0.02 | 126.16 | 8.91 | 0.76 |
| 21835-01-8 | 3-Ethyl-2-hydroxy-2-cyclopenten-1-one | 0.06 | 126.16 | 8.79 | 2.41 |
| 22104-78-5 | 2-Octenol-1 | 2.27 | 128.21 | 8.81 | 2.24 |
| 2217-33-6 | Tetrahydrofurfuryl butyrate | 1.54 | 172.22 | 8.40 | 2.22 |
| 22451-63-4 | Allo-ocimenol | 2.42 | 152.24 | 8.51 | −0.99 |
| 22460-95-3 | 7-Octene-1,6-diol, 3,7-dimethyl- | 1.33 | 172.27 | 8.27 | 0.79 |
| 22924-15-8 | 3-Ethoxybenzaldehyde | 1.99 | 150.18 | 8.14 | 2.33 |
| 22927-13-5 | 2-Ethylbenzaldehyde | 2.06 | 134.18 | 8.78 | 2.53 |
| 2305-21-7 | 2-hexen-1-ol | 1.3 | 100.16 | 8.09 | 2.06 |
| 23495-12-7 | Phenoxyethyl propionate | 2.43 | 194.23 | 8.92 | 1.78 |
| 23911-56-0 | Nerolione | 2.02 | 174.20 | 8.74 | 2.04 |
| 2445-83-2 | 7-Methylcoumarin | 2.42 | 160.17 | 8.79 | 2.78 |
| 2463-63-0 | Butylacrolein | 2.1 | 112.17 | 8.76 | 2.33 |
| 2497-18-9 | 2-Hexen-1-yl acetate | 2.21 | 142.20 | 8.20 | 1.45 |
| 2555-49-9 | Ethyl phenoxyacetate | 2.04 | 180.20 | 8.36 | 1.93 |
| 26553-46-8 | Ethyl trans-3-hexenoate | 2.25 | 142.20 | 8.34 | 2.14 |
| 8/6/2719 | N-Acetyl methyl anthranilate | 1.21 | 193.20 | 8.00 | 1.48 |
| 27829-72-7 | Ethyl trans-2-hexenoate | 2.49 | 142.20 | 8.30 | 2.12 |
| 27939-60-2 | Vertoliff (triplal extra) | 1.8 | 138.21 | 9.24 | 1.71 |
| 28069-72-9 | (2E,6Z)-Nona-2,6-dien-1-ol | 2.43 | 140.23 | 9.59 | 2.24 |
| 28977-58-4 | Ocimenol | 2.02 | 152.24 | 8.71 | −0.59 |
| 29414-56-0 | 2,6-Dimethyl-1,5,7-octatrienol-3 | 1.96 | 152.24 | 8.89 | −0.76 |
| 29548-14-9 | p-Menth-1-ene-9-al | 2.24 | 152.24 | 9.40 | 1.85 |
| 30361-28-5 | 2,4-Octadien-1-al | 2.45 | 124.18 | 9.33 | 2.32 |
| 30954-98-4 | Propyl anthranilate | 2.47 | 179.22 | 8.88 | 1.87 |
| 3194-17-0 | 2-Pentanoylfuran | 1.99 | 152.19 | 8.97 | 2.40 |

| CAS Number | Name | LogP (v3.0) | Formula Weight | Odor Detection Threshold, Neural Net model | bCD Complex Stability Constant |
|---|---|---|---|---|---|
| 32272-48-3 | 4-Ethyl-2-methylthiazole | 1.7 | 127.20 | 8.32 | 2.25 |
| 32764-98-0 | Jasmolactone | 2.36 | 168.24 | 8.72 | 2.96 |
| 33467-73-1 | cis-3-Hexenyl formate | 1.69 | 128.17 | 8.22 | 2.25 |
| 3391-86-4 | 1-Octenol-3 | 2.36 | 128.21 | 8.29 | 2.19 |
| 3581-91-7 | 4,5-Dimethylthiazole | 0.91 | 113.18 | 8.10 | 1.30 |
| 3583-00-4 | 4,4-Dimethyl-5-isopropyl-1,3-dioxolane | 1.92 | 158.24 | 8.99 | 1.98 |
| 35926-04-6 | 1-Hexen-3-yl acetate | 2.31 | 142.20 | 8.02 | 1.68 |
| 36701-01-6 | Furfuryl valerate | 1.89 | 182.22 | 8.39 | 2.12 |
| 36806-46-9 | 2,6-Dimethyl-6-hepten-1-ol | 2.4 | 142.24 | 8.07 | 0.76 |
| 3681-71-8 | cis-3-Hexenyl acetate | 2.18 | 142.20 | 8.16 | 1.48 |
| 3681-82-1 | trans-3-Hexenyl acetate | 2.18 | 142.20 | 8.16 | 1.48 |
| 36880-33-8 | 5-Ethyl-2-thiophenecarbaldehyde | 1.85 | 140.20 | 8.19 | 2.64 |
| 37973-51-6 | 2-Phenyl-1(2)propenyl-1 ester | 2.47 | 176.22 | 8.82 | 0.44 |
| 38142-45-9 | 3-Cyclohexene-1-ethanol, 4-methyl-.beta.-methylene-, €- | 1.84 | 152.24 | 8.62 | 1.58 |
| 39252-02-3 | Furfuryl hexanoate | 2.38 | 196.25 | 8.80 | 2.17 |
| 39677-52-6 | 3-Methoxy Cinnamaldehyde | 1.86 | 162.19 | 8.84 | 2.49 |
| 40010-99-9 | 3-Acetyl-5-butyldihydro-2(3H)-furanone | 1.71 | 184.24 | 8.57 | 2.58 |
| 40790-29-2 | Pyrazine, 3-butyl-2,5-dimethyl- | 2.29 | 164.25 | 8.18 | 2.48 |
| 409-02-9 | Methyl Heptenone | 2.27 | 126.20 | 8.58 | 2.38 |
| 4175-66-0 | 2,5-Dimethylthiazole | 0.94 | 113.18 | 8.08 | 1.63 |
| 4180-23-8 | €-anethol | 2.43 | 148.20 | 8.79 | 2.34 |
| 41847-88-5 | Phenylethyl oxy-acetaldehyde | 1.55 | 164.20 | 8.61 | 2.34 |
| 42348-12-9 | 3-Ethyl-2-hydroxy-4-methylcyclopent-2-en-1-one | 0.54 | 140.18 | 9.10 | 2.58 |
| 3/5/4313 | (E,E)-2,4-heptadien-1-al | 1.98 | 110.16 | 9.00 | 2.29 |
| 6/1/4364 | Cinnamic aldehyde dimethyl acetal | 2.02 | 178.23 | 8.44 | 2.03 |
| 4501-58-0 | Campholene aldehyde | 2.2 | 152.24 | 8.31 | 1.43 |
| 4634-89-3 | cis-4-Hexenal | 1.05 | 98.14 | 9.24 | 2.26 |
| 4643-25-8 | 2-Hepten-4-one | 1.85 | 112.17 | 8.31 | 2.21 |
| 4643-27-0 | 2-Octen-4-one | 2.42 | 126.20 | 8.70 | 2.43 |
| 473-67-6 | Verbenol | 2.03 | 152.24 | 8.09 | 2.61 |
| 4748-78-1 | 4-Ethylbenzaldehyde | 2.39 | 134.18 | 9.19 | 2.54 |
| 491-04-3 | Piperitol | 2.4 | 154.25 | 8.70 | 1.72 |
| 491-09-8 | piperitenone | 2.33 | 150.22 | 8.40 | −1.20 |
| 491-31-6 | Isocoumarin | 1.69 | 146.15 | 8.63 | 2.45 |
| 491-35-0 | Lepidine | 2.46 | 143.19 | 8.13 | 2.44 |
| 11/8/4940 | ethyl maltol | 0.17 | 140.14 | 7.44 | 1.94 |
| 496-77-5 | Butyroin | 1.29 | 144.21 | 8.36 | 2.22 |
| 499-44-5 | Hinokitiol | 1.35 | 164.20 | 9.32 | 2.71 |
| 50888-63-6 | Pyrazine, 2-butyl-3,5-dimethyl- | 2.3 | 164.25 | 8.19 | 2.27 |
| 53046-97-2 | cis-3, cis-6-nonadienol | 2.45 | 140.23 | 9.52 | 2.16 |
| 53398-78-0 | trans-2-Hexenyl formate | 1.71 | 128.17 | 8.31 | 2.23 |
| 53399-81-8 | Ethyl 2-methyl-4-pentenoate | 2.26 | 142.20 | 8.16 | 2.08 |
| 536-50-5 | 1-(4-Methylphenyl)ethanol | 2 | 136.19 | 8.07 | 2.39 |
| 536-59-4 | Perillyl alcohol | 1.83 | 152.24 | 8.58 | 1.69 |
| 536-60-7 | Cumic alcohol | 2.39 | 150.22 | 8.68 | 2.39 |
| 5392-40-5 | Citral | 2.33 | 152.24 | 8.48 | −1.82 |
| 5396-89-4 | Benzyl acetoacetate | 1.43 | 192.21 | 8.05 | 1.45 |
| 12/2/5406 | p-Methylhydrocinnamic aldehyde | 2.19 | 148.20 | 9.57 | 2.84 |
| 541-58-2 | 2,4-Dimethylthiazole | 1.24 | 113.18 | 8.08 | 1.89 |
| 5426-78-8 | Acetaldehyde phenyl ethyl acetal | 2.22 | 166.22 | 8.56 | 1.83 |
| 6/6/5462 | Canthoxal | 2.16 | 178.23 | 8.80 | 2.49 |
| 6/8/5466 | Ethyl 3-mercaptopropionate | 1.36 | 134.19 | 8.92 | 1.25 |
| 5471-51-2 | Raspberry ketone | 1.58 | 164.20 | 7.67 | 1.70 |
| 554-14-3 | 2-Methylthiophene | 2.06 | 98.16 | 8.11 | 1.52 |
| 55722-59-3 | 3,6-Octadienal, 3,7-dimethyl- | 2.34 | 152.24 | 8.51 | −1.89 |
| 5577-44-6 | 2,4-Octadienal | 2.45 | 124.18 | 9.33 | 2.32 |
| 5660-60-6 | Cinnamaldehyde ethylene glycol acetal | 2.15 | 176.22 | 8.04 | 2.16 |
| 56805-23-3 | trans-3, cis-6-nonadienol | 2.45 | 140.23 | 9.52 | 2.16 |
| 57266-86-1 | 2-Heptenal, (2Z)- | 2.1 | 112.17 | 8.76 | 2.33 |
| 57500-00-2 | Methyl furfuryl disulfide | 1.92 | 160.25 | 8.19 | 2.38 |
| 579-74-8 | o-Acetylanisole | 1.55 | 150.18 | 8.40 | 1.56 |
| 58461-27-1 | Lavandulol | 1.95 | 154.25 | 8.98 | −1.82 |
| 585-74-0 | 3-Methylacetophenone | 2.27 | 134.18 | 8.23 | 1.65 |
| 589-18-4 | p-Tolyl alcohol | 1.62 | 122.17 | 8.01 | 2.35 |
| 59020-85-8 | Furfuryl thiopropionate | 1.61 | 170.23 | 8.45 | 2.16 |
| 59021-02-2 | 2-Mercaptomethylpyrazine | 0.34 | 126.18 | 8.26 | 0.66 |
| 5910-85-0 | 2,4-Heptadienal | 1.98 | 110.16 | 9.00 | 2.29 |
| 5912-86-7 | cis-iso-Eugenol | 1.85 | 164.20 | 8.60 | 2.38 |
| 5925-68-8 | S-Ethyl benzothioate | 2.21 | 152.21 | 8.74 | 1.83 |
| 5932-68-3 | trans-Isoeugenol | 1.85 | 164.20 | 8.60 | 2.38 |
| 606-27-9 | Methyl 2-nitrobenzoate | 1.57 | 181.15 | 8.45 | 2.25 |

-continued

| CAS Number | Name | LogP (v3.0) | Formula Weight | Odor Detection Threshold, Neural Net model | bCD Complex Stability Constant |
|---|---|---|---|---|---|
| 606-45-1 | Methyl o-methoxybenzoate | 1.79 | 166.18 | 8.56 | 2.15 |
| 613-70-7 | Guaiacyl acetate | 1.55 | 166.18 | 8.18 | 1.57 |
| 616-44-4 | 3-Methylthiophene | 2.23 | 98.16 | 8.51 | 1.52 |
| 6191-71-5 | cis-4-Hepten-1-ol | 1.77 | 114.19 | 8.46 | 2.11 |
| 6192-44-5 | beta-Phenoxy ethyl acetate | 1.87 | 180.20 | 8.51 | 1.26 |
| 61931-81-5 | cis-3-Hexenyl lactate | 1.34 | 172.22 | 8.20 | 1.76 |
| 620-23-5 | meta-tolyl aldehyde | 2.13 | 120.15 | 8.79 | 2.38 |
| 623-15-4 | 4-(2-Furyl)-3-buten-2-one | 1.7 | 136.15 | 8.42 | 1.38 |
| 624-92-0 | Dimethyl disulfide | 1.06 | 94.19 | 8.64 | 0.27 |
| 6290-14-8 | Cyclopentyl isobutyrate | 2.29 | 156.22 | 8.42 | 2.08 |
| 6314-97-2 | Phenylacetaldehyde diethyl acetal | 2.29 | 194.27 | 9.02 | 2.37 |
| 637-65-0 | tetrahydrofurfuryl propionate | 0.93 | 158.20 | 8.02 | 2.07 |
| 638-02-8 | 2,5-Dimethylthiophene | 2.36 | 112.19 | 8.64 | 2.04 |
| 64988-06-3 | Ethyl 2-methoxybenzyl ether | 1.98 | 166.22 | 8.23 | 2.27 |
| 65405-67-6 | p-Methoxy-alpha-methyl cinnamaldehyde | 2 | 176.22 | 8.85 | 1.16 |
| 65405-73-4 | Geranyl oxyacetaldehyde | 2.32 | 196.29 | 8.71 | −1.88 |
| 67028-40-4 | Ethyl (p-tolyloxy)acetate | 2.49 | 194.23 | 8.45 | 2.18 |
| 6728-26-3 | Trans-2-Hexenal | 1.57 | 98.14 | 8.41 | 2.26 |
| 6728-31-0 | cis-4-Heptenal | 1.85 | 112.17 | 9.51 | 2.33 |
| 67633-97-0 | 3-Mercapto-2-pentanone | 1.37 | 118.19 | 8.86 | 0.23 |
| 67634-07-5 | 3,5,6-Trimethyl-3-cyclohexene-1-carbaldehyde | 2.37 | 152.24 | 8.63 | 1.97 |
| 67634-16-6 | Floralol | 1.83 | 140.23 | 8.38 | 1.50 |
| 67634-17-7 | 2,4-Dimethyl-3-cyclohexene-1-methanol | 1.81 | 140.23 | 8.51 | 1.61 |
| 67746-30-9 | trans-2-Hexenal diethyl acetal | 2.34 | 172.27 | 8.19 | 2.13 |
| 67801-65-4 | 3,6-ivy carbaldehyde | 1.8 | 138.21 | 9.25 | 2.09 |
| 67845-46-9 | p-Methyl phenoxy acetaldehyde | 1.76 | 150.18 | 8.64 | 2.40 |
| 6789-80-6 | (Z)-3-hexen-1-al | 1.43 | 98.14 | 8.97 | 2.26 |
| 68039-48-5 | Dimethyl cyclohexene carboxaldehyde | 1.82 | 138.21 | 9.18 | 1.65 |
| 68039-49-6 | 2,4-Dimethyl-3-Cyclohexene-1-carboxaldehyde (Ligustral) | 1.78 | 138.21 | 9.24 | 1.76 |
| 68133-76-6 | cis-3-Hexenyl pyruvate | 1.9 | 170.21 | 8.50 | 1.30 |
| 68737-61-1 | 3,5-ivy carbaldehyde | 1.82 | 138.21 | 9.18 | 1.65 |
| 698-76-0 | delta-Octalactone | 2.03 | 142.20 | 8.24 | 2.83 |
| 699-10-5 | Methyl benzyl disulfide | 2.47 | 170.29 | 8.45 | 2.96 |
| 701-70-2 | 1-Phenylbutan-2-ol | 2.21 | 150.22 | 8.59 | 2.26 |
| 7452-79-1 | Ethyl 2-methylbutyrate | 1.91 | 130.19 | 7.27 | 1.75 |
| 74-93-1 | Methyl mercaptan | 0.58 | 48.10 | 8.63 | 0.43 |
| 7493-63-2 | Allyl anthranilate | 2.31 | 177.20 | 8.48 | 1.95 |
| 7493-71-2 | Allyl tiglate | 1.86 | 140.18 | 8.12 | 0.69 |
| 75-08-1 | Ethanethiol | 1.37 | 62.13 | 8.87 | 0.63 |
| 75-18-3 | dimethyl sulfide | 1.24 | 62.13 | 8.33 | 0.86 |
| 75-33-2 | 2-Propanethiol | 1.65 | 76.16 | 9.26 | 0.87 |
| 7540-51-4 | (−)-Citronellol | 2.49 | 156.27 | 8.37 | 0.64 |
| 7549-33-9 | Anisyl propionate | 2.23 | 194.23 | 8.45 | 2.08 |
| 75-66-1 | tert-Butyl mercaptan | 1.65 | 90.18 | 9.13 | 1.13 |
| 764-40-9 | 2,4-Pentadienal | 0.7 | 82.10 | 8.16 | 2.37 |
| 76649-25-7 | 3,6-Nonadien-1-ol | 2.45 | 140.23 | 9.52 | 2.16 |
| 774-48-1 | Benzaldehyde diethyl acetal | 2.03 | 180.25 | 8.57 | 2.35 |
| 7774-74-5 | 2-Thienyl mercaptan | 1.77 | 116.20 | 8.00 | 0.81 |
| 7774-79-0 | 4-(p-Tolyl)-2-butanone | 2.46 | 162.23 | 8.64 | 2.01 |
| 7774-96-1 | Isoeugenyl formate | 2.35 | 192.21 | 8.84 | 2.71 |
| 7786-44-9 | 2,6-Nonadien-1-ol | 2.43 | 140.23 | 9.59 | 2.24 |
| 7786-61-0 | 2-Methoxy-4-vinylphenol | 2.24 | 150.18 | 8.71 | 2.37 |
| 7786-67-6 | p-Menth-8-en-3-ol (8CI) | 2.48 | 154.25 | 8.42 | 2.29 |
| 81925-81-7 | filbert 23eptanone (Filbertone) | 2.31 | 126.20 | 8.06 | 1.92 |
| 84434-18-4 | Gardamide | 2.16 | 191.27 | 8.08 | 1.98 |
| 85-91-6 | Dimethyl anthranilate | 2.19 | 165.19 | 8.13 | 2.08 |
| 870-23-5 | Allyl mercaptan | 1.42 | 74.14 | 9.00 | 0.85 |
| 87-25-2 | Ethyl anthranilate | 2.05 | 165.19 | 8.58 | 1.84 |
| 874-66-8 | cinnamon acrolein | 1.29 | 136.15 | 8.09 | 0.92 |
| 881-68-5 | Vanillin acetate | 0.95 | 194.18 | 8.11 | 1.94 |
| 89-79-2 | Isopulegol | 2.48 | 154.25 | 8.42 | 2.29 |
| 90-02-8 | Salicylaldehyde | 1.4 | 122.12 | 8.95 | 2.21 |
| 90-05-1 | Guaiacol | 1.33 | 124.14 | 8.06 | 1.98 |
| 90-87-9 | Hydratropaldehyde dimethyl acetal | 2.12 | 180.25 | 8.60 | 2.24 |
| 91-64-5 | Coumarin | 1.68 | 146.15 | 8.55 | 2.47 |
| 928-94-9 | (Z)-2-hexen-1-ol | 1.3 | 100.16 | 8.09 | 2.06 |
| 928-95-0 | E-2-hexen-1-ol | 1.3 | 100.16 | 8.09 | 2.06 |
| 928-96-1 | cis-3-Hexen-1-ol | 1.3 | 100.16 | 8.06 | 2.06 |
| 93-16-3 | Methyl isoeugenol | 2.05 | 178.23 | 8.70 | 2.49 |
| 93-29-8 | Isoeugenyl acetate | 2.17 | 206.24 | 8.38 | 1.94 |
| 93-53-8 | 2-phenyl propionaldehyde | 2.06 | 134.18 | 8.43 | 2.21 |

-continued

| CAS Number | Name | LogP (v3.0) | Formula Weight | Odor Detection Threshold, Neural Net model | bCD Complex Stability Constant |
|---|---|---|---|---|---|
| 93-54-9 | 1-Phenyl-1-propanol | 1.77 | 136.19 | 8.21 | 2.03 |
| 93-58-3 | Methyl benzoate | 1.86 | 136.15 | 8.03 | 2.00 |
| 93-89-0 | Ethyl benzoate | 2.25 | 150.18 | 8.60 | 2.18 |
| 93893-89-1 | Citronitrile | 2.34 | 171.24 | 8.57 | 1.27 |
| 93-92-5 | Styrallyl acetate | 2.2 | 164.20 | 8.18 | 1.54 |
| 94089-01-7 | Butanoic acid, 2-methyl-, 2-hexenyl ester, €- | 1.6 | 134.24 | 9.32 | 1.41 |
| 94-86-0 | Vanitrope | 2.42 | 178.23 | 8.53 | 2.39 |
| 95-20-5 | 2-Methylindole | 2.43 | 131.18 | 8.53 | 2.58 |
| 97-53-0 | Eugenol | 2.21 | 164.20 | 8.57 | 2.51 |

One grouping of perfume raw materials that have a complex stability constant of about 3.0 or less, a C log P of about 2.5 or less, and a weight average molecular weight of about 200 Daltons or less includes beta gamma hexanol; cis 3 hexenyl acetate; ethyl-2-methyl butyrate; amyl-acetate (isomer blends); vanillin; anethole; methyl isoeugenol; guiacol; floralol; ethyl vanillin; 2,6-nonadien-1-ol; coumarin; and combinations thereof. Another group of perfume raw materials that have a complex stability constant of about 3.0 or less, a C log P of about 2.5 or less, and a weight average molecular weight of about 200 Daltons or less includes ethyl-2-methyl butyrate; beta gamma hexanol; iso amyl acetate; amyl acetate; cis-3-Hexenyl acetate; gamma-Octalactone; ethyl vanillin; vanillin; benzaldehyde; and combinations thereof. An additional group of perfume raw materials that have a complex stability constant of about 3.0 or less, a C log P of about 2.5 or less, and a weight average molecular weight of about 200 Daltons or less includes dimethyl anthranilate; iso-eugenyl acetate; canthoxal; 3,6-nonadien-1-ol, triplal; and combinations thereof. Ethyl-2-methyl butyrate, Beta gamma hexenol, Iso amyl acetate, Amyl acetate, cis-3-Hexenyl Acetate, gamma-Octalactone, Ethyl Vanillin, Vanillin, Benzaldehyde.

Some examples of perfume raw materials with an odor detection threshold of 7-log ppb or more include can be found in the chart above.

The odor control compositions of the present disclosure may comprise about 3 percent by weight or greater or more preferably about 4 percent by weight or greater of complexed perfume composition, specifically reciting all values within these ranges and any ranges created thereby. For example, the complexed perfume composition may be present in the odor control composition in an amount of about 3 percent by weight to about 6 percent by weight or, more preferably, from about 4 percent by weight to about 6 percent by weight, specifically including all values within these ranges and any ranges created thereby.

Without wishing to be bound by theory, it is believed that below about 4 percent by weight, the complexed perfume composition may not provide the desired level of odor control in the article during use. It is also believed that above about 6 percent by weight, the complexed perfume composition may not be completely encapsulated or complexed by the methylated β-cyclodextrin. With the weight percentages of methylated β-cyclodextrin disclosed herein, complexed perfume composition concentrations of about 6 percent or less are believed to be substantially, if not completely, encapsulated or complexed by the methylated β-cyclodextrin.

However, as discussed above, some users prefer an initial perfume bloom prior to use of the absorbent article, in addition to the bloom upon activation (wetting) of the methylated β-cyclodextrin in the odor control composition during use. For these users, including a separate, non-complexed perfume composition, which comprises a perfume and an organic solvent, provides the user with an initial perfume bloom, prior to use of the absorbent article, as well as odor control and an optimal scent experience during use. Additionally, providing a separate, non-complexed perfume composition allows for the scent of the initial perfume bloom—the "pre-scent"—to be different from the scent provided via the odor control composition. Specifically, though some initial perfume bloom may also be achieved by increasing the concentration of perfume raw materials in the odor control composition, this approach does not allow for the decoupling of the scent of the initial perfume bloom from the scent of the odor control composition, because both scents rely on the same perfume raw materials.

Cyclodextrin-Compatible Surfactants

The optional cyclodextrin-compatible surfactant provides a low surface tension that permits the composition to spread readily and more uniformly on hydrophobic surfaces. It has been found that the aqueous solution, without such a surfactant, may not spread satisfactorily. The spreading of the composition also allows it to dry faster, so that the treated material is ready to use sooner.

The surfactant for use in providing the low surface tension in the odor control composition of the present invention should be cyclodextrin-compatible. Namely, the surfactant should not substantially form a complex with the cyclodextrin thereby diminishing performance of the cyclodextrin and/or the surfactant. Complex formation diminishes both the amount of cyclodextrin that can release perfume and the ability of the surfactant to lower the surface tension of the aqueous composition. Suitable cyclodextrin-compatible surfactants can be readily identified by the absence of effect of cyclodextrin on the surface tension provided by the surfactant. This is achieved by determining the surface tension (in dyne/cm$^2$) of aqueous solutions of the surfactant in the presence and in the absence of about 1% of a specific cyclodextrin in the solutions. The aqueous solutions contain surfactant at concentrations of approximately 0.5%, 0.1%, 0.01%, and 0.005%. The cyclodextrin can affect the surface activity of a surfactant by elevating the surface tension of the surfactant solution. If the surface tension at a given concentration in water differs by more than about 10% from the surface tension of the same surfactant in the 1% solution of the cyclodextrin, that is an indication of a strong interaction between the surfactant and the cyclodextrin. The preferred surfactants herein should have a surface tension in an aqueous solution that is different (lower) by less than about 10%, preferably less than about 5%, and more preferably less than about 1% from that of the same concentration solution containing 1% cyclodextrin.

Nonlimiting examples of cyclodextrin-compatible nonionic surfactants include block copolymers of ethylene oxide and propylene oxide. Suitable block polyoxyethylenepolyoxypropylene polymeric surfactants, that are compatible with most cyclodextrins, include those based on ethylene glycol, propylene glycol, glycerol, trimethylolpropane and ethylenediamine as the initial reactive hydrogen compound. Polymeric compounds made from a sequential ethoxylation and propoxylation of initial compounds with a single reactive hydrogen atom, such as C12-18 aliphatic alcohols, are not generally compatible with the cyclodextrin.

Certain of the block polymer surfactant compounds designated Pluronic® and Tetronic® by the BASF-Wyandotte Corp., Wyandotte, Mich., are readily available. Nonlimiting examples of cyclodextrin-compatible surfactants of this type include: Pluronic Surfactants with the general formula H(EO)n(PO)m(EO)nH, wherein EO is an ethylene oxide group, PO is a propylene oxide group, and n and m are numbers that indicate the average number of the groups in the surfactants.

Typical examples of cyclodextrin-compatible Pluronic surfactants are shown in Table 2:

TABLE 2

| Name | Avg MW | Avg n | Avg m |
|---|---|---|---|
| L-101 | 3800 | 4 | 59 |
| L-81 | 2750 | 3 | 42 |
| L-44 | 2200 | 10 | 23 |
| L-43 | 1850 | 6 | 22 |
| F-38 | 4700 | 43 | 16 |
| P-84 | 4200 | 19 | 43, | and mixtures thereof.

Tetronic Surfactants with the general formula:

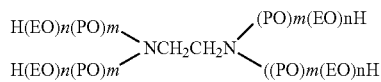

wherein EO, PO, n, and m have the same meanings as above. Typical examples of cyclodextrin-compatible Tetronic surfactants are shown in Table 3:

TABLE 3

| Name | Avg MW | Avg n | Avg m |
|---|---|---|---|
| 901 | 4700 | 3 | 18 |
| 908 | 25000 | 114 | 22, | and mixtures thereof.

"Reverse" Pluronic and Tetronic surfactants have the following general formulas: Reverse Pluronic Surfactants H(PO)m(EO)n(PO)mH, Reverse Tetronic Surfactants

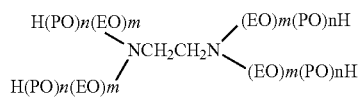

wherein EO, PO, n, and m have the same meanings as above.

Typical examples of cyclodextrin-compatible Reverse Pluronic and Reverse Tetronic surfactants are:
Reverse Pluronic surfactants in Table 4:

TABLE 4

| Name | Avg MW | Avg n | Avg m |
|---|---|---|---|
| 10 R5 | 1950 | 8 | 22 |
| 25 R1 | 2700 | 21 | 6 |

Reverse Tetronic surfactants in Table 5:

TABLE 5

| Name | Avg MW | Avg n | Avg m |
|---|---|---|---|
| 130 R2 | 7740 | 9 | 26 |
| 70 R2 | 3870 | 4 | 13, | and mixtures thereof.

A preferred class of cyclodextrin-compatible nonionic surfactants are the polyalkyleneoxide polysiloxanes having a dimethyl polysiloxane hydrophobic moiety and one or more hydrophilic polyalkylene side chains and have the general formula:

$$R^1-(CH_3)_2SiO-[(CH_3)_2SiO]a[(CH3)(R^1)SiO]b-Si(CH_3)_2-R^1$$

wherein a+b are from about 1 to about 50, preferably from about 3 to about 30, more preferably from about 10 to about 25, and each R1 is the same or different and is selected from the group consisting of methyl and a poly(ethyleneoxide/propyleneoxide)copolymer group having the general formula:

$$(CH_2)_nO(C_2H_4O)_c(C_3H_6O)_dR^2$$

with at least one R1 being a poly(ethyleneoxide/propyleneoxide)copolymer group, and wherein n is 3 or 4, preferably 3; total c (for all polyalkyleneoxy side groups) has a value of from 1 to about 100, preferably from about 6 to about 100; total d is from 0 to about 14, preferably from 0 to about 3; and more preferably d is 0; total c+d has a value of from about 5 to about 150, preferably from about 9 to about 100 and each $R^2$ is the same or different and is selected from the group consisting of hydrogen, an alkyl having 1 to 4 carbon atoms, and an acetyl group, preferably hydrogen and methyl group.

Examples of this type of surfactants are the Silwet® surfactants which are available OSi Specialties, Inc., Danbury, Conn. Representative Silwet surfactants are shown in Table 6.

TABLE 6

| Name | Avg MW | Avg a + b | Avg total c |
|---|---|---|---|
| L-7608 | 600 | 1 | 9 |
| L-7607 | 1000 | 2 | 17 |
| L-77 | 600 | 1 | 9 |
| L-7605 | 6000 | 20 | 99 |
| L-7604 | 4000 | 21 | 53 |
| L-7600 | 4000 | 11 | 68 |
| L-7657 | 5000 | 20 | 76 |
| L-7602 | 3000 | 20 | 29 |

The molecular weight of the polyalkyleneoxy group ($R^1$) is less than or equal to about 10,000. Preferably, the molecular weight of the polyalkyleneoxy group is less than or equal to about 8,000, and most preferably ranges from about 300 to about 5,000. Thus, the values of c and d can be those numbers which provide molecular weights within these ranges. However, the number of ethyleneoxy units (—$C_2H_4O$) in the polyether chain ($R^1$) must be sufficient to render the polyalkyleneoxide polysiloxane water dispersible or water soluble. If propyleneoxy groups are present in the polyalkylenoxy chain, they can be distributed randomly in the chain or exist as blocks. Preferred Silwet surfactants are L-7600, L-7602, L-7604, L-7605, L-7657, and mixtures thereof. Besides surface activity, polyalkyleneoxide polysiloxane surfactants can also provide other benefits, such as antistatic benefits, lubricity and softness to fabrics. The preparation of polyalkyleneoxide polysiloxanes is well known in the art. Polyalkyleneoxide polysiloxanes of the present invention can be prepared according to the procedure set forth in U.S. Pat. No. 3,299,112, incorporated herein by reference. Typically, polyalkyleneoxide polysiloxanes of the surfactant blend of the present invention are readily prepared by an addition reaction between a hydrosiloxane (i.e., a siloxane containing silicon-bonded hydrogen) and an alkenyl ether (e.g., a vinyl, allyl, or methallyl ether) of an alkoxy or hydroxy end-blocked polyalkylene oxide). The reaction conditions employed in addition reactions of this type are well known in the art and in general involve heating the reactants (e.g., at a temperature of from about 85° C. to 110° C.) in the presence of a platinum catalyst (e.g., chloroplatinic acid) and a solvent (e.g., toluene).

Nonlimiting examples of cyclodextrin-compatible anionic surfactants are the alkyldiphenyl oxide disulfonate, having the general formula:

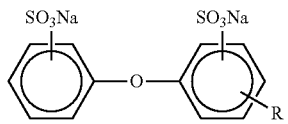

wherein R is an alkyl group. Examples of this type of surfactants are available from the Dow Chemical Company under the trade name Dowfax® wherein R is a linear or branched C6-C16 alkyl group. An example of these cyclodextrin-compatible anionic surfactant is Dowfax 3B2 with R being approximately a linear C10 group. These anionic surfactants are preferably not used when the antimicrobial active or preservative, etc., is cationic to minimize the interaction with the cationic actives, since the effect of both surfactant and active are diminished. The surfactants above are either weakly interactive with cyclodextrin (less than 5% elevation in surface tension, or non-interactive (less than 1% elevation in surface tension). Normal surfactants like sodium dodecyl sulfate and dodecanolpoly(6)ethoxylate are strongly interactive, with more than a 10% elevation in surface tension in the presence of a typical cyclodextrin like hydroxypropyl betacyclodextrin and methylated beta-cyclodextrin.

Typical levels of cyclodextrin-compatible surfactants in usage compositions are from about 0.01% to about 2%, preferably from about 0.03% to about 0.6%, more preferably from about 0.05% to about 0.3%, by weight of the composition, specifically reciting all values within these ranges and any ranges created thereby.

Preservative

The odor control composition may optionally comprise a water-soluble, antimicrobial preservative. As noted previously, cyclodextrin molecules are made up of varying numbers of glucose units which can make them a prime breeding ground for certain microorganisms, especially when in aqueous compositions. This drawback can lead to the problem of storage stability of cyclodextrin solutions for any significant length of time. Contamination by certain microorganisms with subsequent microbial growth can result in an unsightly and/or malodorous solution. Because microbial growth in cyclodextrin solutions is highly objectionable when it occurs, it is highly preferable to include a solubilized, water-soluble, antimicrobial preservative, which is effective for inhibiting and/or regulating microbial growth in order to increase storage stability of the preferably clear, aqueous odor-absorbing solution containing water-soluble cyclodextrin.

It is preferable to use a broad spectrum preservative, e.g., one that is effective on both bacteria (both gram positive and gram negative) and fungi. A limited spectrum preservative, e.g., one that is only effective on a single group of microorganisms, e.g., fungi, can be used in combination with a broad spectrum preservative or other limited spectrum preservatives with complimentary and/or supplementary activity. A mixture of broad spectrum preservatives can also be used. In some cases where a specific group of microbial contaminants is problematic (such as Gram negatives), aminocarboxylate chelators may be used alone or as potentiators in conjunction with other preservatives. These chelators which include, e.g., ethylenediaminetetraacetic acid (EDTA), hydroxyethylenediaminetriacetic acid, diethylenetriaminepentaacetic acid, and other aminocarboxylate chelators, and mixtures thereof, and their salts, and mixtures thereof, can increase preservative effectiveness against Gram-negative bacteria, especially *Pseudomonas* species. Antimicrobial preservatives useful in the odor compositions of the present disclosure include biocidal compounds, i.e., substances that kill microorganisms, or biostatic compounds, i.e., substances that inhibit and/or regulate the growth of microorganisms. Preferred antimicrobial preservatives are those that are water-soluble and are effective at low levels because the organic preservatives can form inclusion complexes with the cyclodextrin molecules and compete with the fragrance molecules for the cyclodextrin cavities, thus limiting the amount of cyclodextrins available to release fragrance. Water-soluble preservatives useful in the present invention are those that have a solubility in water of at least about 0.3 g per 100 ml of water, i.e., greater than about 0.3% at room temperature, preferably greater than about 0.5% at room temperature. These types of preservatives have a lower affinity to the cyclodextrin cavity, at least in the aqueous phase, and are therefore more available to provide antimicrobial activity. Preservatives with a water-solubility of less than about 0.3% and a molecular structure that readily fits into the cyclodextrin cavity, have a greater tendency to form inclusion complexes with the cyclodextrin molecules, thus rendering the preservative less effective to control microbes in the cyclodextrin solution. Therefore, many well-known preservatives such as short chain alkyl esters of p-hydroxybenzoic acid, commonly known as parabens; N-(4-chlorophenyl)-N'-(3,4-dichlorophenyl)urea, also known as 3,4,4'-trichlorocarbanilide or triclocarban; 2,4,4'-trichloro-2'-hydroxy diphenyl ether, commonly known as triclosan are not preferred in the odor control composition of the present disclosure since they are relatively ineffective when used in conjunction with cyclodextrin.

The water-soluble preservative in the odor control composition of the present disclosure is included at an effective amount. The term "effective amount" as herein defined means a level sufficient to prevent spoilage, or prevent growth of inadvertently added microorganisms, for a specific period of time. In other words, the preservative is not being used to kill microorganisms on the surface onto which the composition is deposited in order to eliminate odors produced by microorganisms. Instead, it is preferably being used to prevent spoilage of the cyclodextrin solution in order to increase the shelf-life of the composition.

Preferred levels of preservative are from about 0.5% to about 1.0%, more preferably from about 0.5% to about 0.9%, most preferably from about 0.5% to about 0.8%, by weight of the usage composition, specifically reciting all values within these ranges and any ranges created thereby. Without wishing to be bound by theory, it is believed that below about 0.5 percent by weight of preservative may allow unacceptable levels of microbial growth to occur. And it is further believed that above about 1.0 percent, the benefit received from additional preservative is greatly diminished.

In order to reserve most of the cyclodextrins for odor control, the cyclodextrin to preservative molar ratio should be greater than about 5:1, preferably greater than about 10:1, more preferably greater than about 50:1, even more preferably greater than about 100:1. The preservative can be any organic preservative material which will not cause damage to any layers of the absorbent article, e.g., topsheet, secondary topsheet, absorbent core, backsheet, etc. via discoloration, coloration, bleaching. Preferred water-soluble preservatives include organic sulfur compounds, halogenated compounds, cyclic organic nitrogen compounds, low molecular weight aldehydes, quaternary ammonium compounds, dehydroacetic acid, phenyl and phenolic compounds, and mixtures thereof.

The following are non-limiting examples of preferred water-soluble preservatives for use in the odor control compositions of the present disclosure.

(A). Organic Sulfur Compounds

Preferred water-soluble preservatives for use in the present invention are organic sulfur compounds. Some nonlimiting examples of organic sulfur compounds suitable for use in the present invention are:

(i) 3-Isothiazolone Compounds

A preferred preservative is an antimicrobial, organic preservative containing 3-isothiazolone groups having the formula:

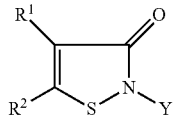

Wherein Y is an unsubstituted alkyl, alkenyl, or alkynyl group of from about 1 to about 18 carbon atoms, an unsubstituted or substituted cycloalkyl group having from about a 3 to about a 6 carbon ring and up to 12 carbon atoms, an unsubstituted or substituted aralkyl group of up to about 10 carbon atoms, or an unsubstituted or substituted aryl group of up to about 10 carbon atoms; $R^1$ is hydrogen, halogen, or a (C1-C4) alkyl group; and $R^2$ is hydrogen, halogen, or a (C1-C4) alkyl group. Preferably, when Y is methyl or ethyl, $R^1$ and $R^2$ should not both be hydrogen.

Salts of these compounds formed by reacting the compound with acids such as hydrochloric, nitric, sulfuric, etc. are also suitable. This class of compounds is disclosed in U.S. Pat. No. 4,265,899, Lewis et al., issued May 5, 1981, and incorporated herein by reference. Examples of said compounds are: 5-chloro-2-methyl-4-isothiazolin-3-one; 2-n-butyl-3-isothiazolone; 2-benzyl-3-isothiazolone; 2-phenyl-3-isothiazolone, 2-methyl-4,5-dichloroisothiazolone; 5-chloro-2-methyl-3-isothiazolone; 2-methyl-4-isothiazolin-3-one; and mixtures thereof. A preferred preservative is a water-soluble mixture of 5-chloro-2-methyl-4-isothiazolin-3-one and 2-methyl-4-isothiazolin-3-one, more preferably a mixture of about 77% 5-chloro-2-methyl-4-isothiazolin-3-one and about 23% 2-methyl-4-isothiazolin-3-one, a broad spectrum preservative available as a 1.5% aqueous solution under the trade name Kathon® CG by Rohm and Haas Company. Other isothiazolins include 1,2-benzisothiazolin-3-one, available under the trade name Proxel® products; and 2-methyl-4,5-trimethylene-4-isothiazolin-3-one, available under the trade name Promexal®. Both Proxel and Promexal are available from Zeneca. They have stability over a wide pH range (i.e., 4-12). These preservatives don't contain active halogens and don't release formaldehyde.

(ii) Sodium Pyrithione

Another preferred organic sulfur preservative is sodium pyrithione, with water solubility of about 50%. Mixtures of the preferred organic sulfur compounds can also be used as the preservative in the present invention.

(B). Halogenated Compounds

Preferred preservatives for use in the present invention are halogenated compounds. Some non-limiting examples of halogenated compounds suitable for use in the odor control composition of the present disclosure are: 5-bromo-5-nitro-1,3-dioxane, available under the trade name Bronidox L® from Henkel. Bronidox L® has a solubility of about 0.46% in water; 2-bromo-2-nitropropane-1,3-diol, available under the trade name Bronopol® from Inolex having a solubility of about 25% in water; 1,1'-hexamethylene bis(5-(p-chlorophenyl) biguanide), commonly known as chlorhexidine, and its salts, e.g., with acetic and gluconic acids can be used as a preservative in the odor control composition of the present disclosure. The digluconate salt is highly water-soluble, about 70% in water, and the diacetate salt has a solubility of about 1.8% in water. Another suitable preservative is 1,1,1,-Trichloro-2-methylpropan-2-ol, commonly known as chlorobutanol, with water solubility of about 0.8%; 4,4'-(Trimethylenedioxy)bis-(3-bromobenzamidine) diisethionate, or dibromopropamidine, with water solubility of about 50%; or mixtures thereof.

(C). Cyclic Organic Nitrogen Compounds

Preferred water-soluble preservatives for use in the odor control composition of the present disclosure are cyclic organic nitrogen compounds. Some non-limiting examples of cyclic organic nitrogen compounds suitable for use in the present invention are:

(i) Imidazolidinedione Compounds

Preferred preservatives for use in the odor control composition of the present disclosure are imidazolidione compounds. Some non-limiting examples of imidazolidinedione compounds suitable for use in the present invention are: 1,3-bis(hydroxymethyl)-5,5-dimethyl-2,4-imidazolidinedione, commonly known as dimethyloldimethylhydantoin, or DMDM hydantoin, available as, e.g., Glydant® from Lonza. DMDM hydantoin has a water solubility of more than 50% in water and is mainly effective on bacteria. When DMDM hydantoin is used, it is preferable that it be used in combination with a broad spectrum preservative such as Kathon CG®, or formaldehyde. A preferred mixture is about a 95:5 DMDM hydantoin to 3-butyl-2-iodopropynylcarbamate mixture, available under the trade name Glydant Plus® from Lonza; N-[1,3-bis(hydroxymethyl)2,5-dioxo-4-imidazolidinyl]-N,N'-bis(hydroxymethyl)urea, commonly known as diazolidinyl urea, available under the trade name Germall II® from Sutton Laboratories, Inc. (Sutton) can be used as the preservative in the odor control composition of the present disclosure; N,N"-methylenebis{N'-[1-(hydroxymethyl)-2,5-dioxo-4-imidazolidinyl]urea}, commonly known as imidazolidinyl urea, available, e.g., under the trade name Abiol® from 3V-Sigma, Unicide U-13® from Induchem, Germall 115® from (Sutton), or mixtures thereof.

(ii) Polymethoxy Bicyclic Oxazolidine

Another preferred water-soluble cyclic organic nitrogen preservative is polymethoxy bicyclic oxazolidine, having the general formula:

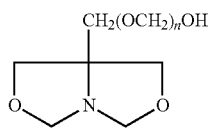

where n has a value of from about 0 to about 5 and is available under the trade name Nuosept® C from Huls America. Mixtures of the preferred cyclic organic nitrogen compounds can also be used as the preservative in the odor control composition of the present disclosure.

(D). Low Molecular Weight Aldehydes (i). Formaldehyde

A preferred preservative for use in the odor control composition of the present disclosure is formaldehyde. Formaldehyde is a broad spectrum preservative which is normally available as formalin which is a 37% aqueous solution of formaldehyde.

(ii) Glutaraldehyde

A preferred preservative for use in the odor control composition of the present disclosure is glutaraldehyde. Glutaraldehyde is a water-soluble, broad spectrum preservative commonly available as a 25% or a 50% solution in water.

(E). Quaternary Compounds

Preferred preservatives for use in the present invention are cationic and/or quaternary compounds. Such compounds include polyaminopropyl biguanide, also known as polyhexamethylene biguanide having the general formula:

HCl·NH$_2$—(CH$_2$)$_3$—[—(CH$_2$)$_3$—NH—C(=NH·HCl)—NH—(CH$_2$)$_3$-]$_x$—(CH$_2$)$_3$—NH—C(=NH)—NH·CN

Polyaminopropyl biguanide is a water-soluble, broad spectrum preservative which is available as a 20% aqueous solution available under the trade name Cosmocil CQ® from ICI Americas, Inc., or under the trade name Mikrokill® from Brooks, Inc; 1-(3-Chlorallyl)-3,5,7-triaza-1-azoniaadamantane chloride, available, e.g., under the trade name Dowicil 200 from Dow Chemical, is an effective quaternary ammonium preservative; it is freely soluble in water; however, it has the tendency to discolor (yellow), therefore it is not highly preferred.

Mixtures of the preferred quaternary ammonium compounds can also be used as the preservative in the odor control compositions of the present disclosure.

(F). Dehydroacetic Acid

A preferred preservative for use in the present invention is dehydroacetic acid. Dehydroacetic acid is a broad spectrum preservative preferably in the form of a sodium or a potassium salt so that it is water-soluble. This preservative acts more as a biostatic preservative than a biocidal preservative.

(G). Phenyl and Phenolic Compounds

Some non-limiting examples of phenyl and phenolic compounds suitable for use in odor control compositions of the present disclosure are: 4,4'-diamidino-a,w-diphenoxypropane diisethionate, commonly known as propamidine isethionate, with water solubility of about 16%; and 4,4'-diamidino-α,ω-diphenoxyhexane diisethionate, commonly known as hexamidine isethionate. Other examples are benzyl alcohol, with a water solubility of about 4%.

Additional suitable preservatives for the compositions of the present disclosure may consist of or include one or more compounds represented by the following Structure (I):

HO—CH$_2$CH$_2$—R  (I)

wherein R is a substituted or unsubstituted phenyl group or a substituted or unsubstituted phenoxy group. For example, R may be either an unsubstituted phenyl group or an unsubstituted phenoxy group. Mixtures of compounds represented by Structure (I) may also be used.

Thus, either or both of 2-phenoxyethanol, with a water solubility of about 2.67%, and 2-phenylethanol, with a water solubility of about 2%, may be used as preservatives in the composition of the present disclosure. 2-Phenoxyethanol is also known as ethylene glycol phenyl ether; ethylene glycol monophenyl ether; and 1-hydroxy-2-phenoxyethane, and may be obtained as DOWANOL PhE, DOWANOL, EPh, or DOWANOL, EP from various commercial sources. 2-Phenylethanol is also known as phenylethanol; 2-phenylethan-1-ol; phenethyl alcohol; β-hydroxyethylbenzene; phenylethyl alcohol; β-phenylethanol; and benzyl carbinol and may be obtained from various commercial sources.

(H). Mixtures Thereof

The preservatives of the present invention can be used in mixtures in order to control a broad range of microorganisms. Bacteriostatic effects can sometimes be obtained for aqueous compositions by adjusting the composition pH to an acid pH, e.g., less than about pH 4, preferably less than about pH 3, or a basic pH, e.g., greater than about 10, preferably greater than about 11. Low pH for microbial control is not a preferred approach in the present invention because the low pH can cause chemical degradation of the cyclodextrins. High pH for microbial control is also not preferred because at high pH's, e.g., greater than about 10, preferably greater than about 11, the cyclodextrins can be ionized and their ability to complex with organic materials is reduced. Therefore, aqueous compositions of the odor control composition of the present disclosure should have a pH of from about 3 to about 10, preferably 5 from about 4 to about 8, more preferably from about 4.5 to about 6. The pH can be adjusted with inorganic molecules to minimize complexation with cyclodextrin.

Position-Specific Substituted β-Cyclodextrins

The odor control compositions of the present disclosure comprise cyclodextrin complexes that are position-specific substituted β-cyclodextrins comprising one or more odor controlling compounds, hereafter, "substituted β-cyclodextrin complexes." The position-specific-substituted β-cyclodextrins described herein comprises various degrees of substitution in the 2, 3, and 6 positions. As discussed herein, position-specific substituted β-cyclodextrins with substitution in positions 2 and 6 provide benefits over conventional β-cyclodextrins and over completely substituted cyclodextrins, i.e., complete substitution in positions, 2, 3, and 6. There are many benefits to utilizing position-specific-substituted β-cyclodextrins. For example, position-specific-substituted cyclodextrins have a higher solubility than their conventional β-cyclodextrin counterparts. The increased solubility can provide more rapid release of encapsulated fragrances in the position-specific substituted β-cyclodextrin. Also, with the increased solubility, less moisture may be required to liberate encapsulated fragrances in the position-specific substituted β-cyclodextrin. This increased solubility can also mean that less position-specific substituted β-cyclodextrin may be utilized in absorbent articles than their β-cyclodextrin counterparts.

Because of the increased solubility of the position-specific substituted β-cyclodextrins, there are methods of application of the position-specific substituted β-cyclodextrins which are not available for their conventional β-cyclodextrin counterparts. With the new methods of application, the position-specific substituted β-cyclodextrins may be provided to areas of the absorbent article which may not have been possible with their conventional β-cyclodextrin counterparts. Additionally, the position-specific substituted β-cyclodextrins can provide higher efficacy than their conventional β-cyclodextrin counterparts.

As known, cyclodextrins are a family of compounds where a number of glucose units are bound together in a ring shaped structure (cyclic oligosaccharides). More specifically cyclodextrins are formed by 5 or more α-D-glucopyranoside units connected through the glycosidic linkages in positions 1 and 4 on the glucose ring. Typically, the number of glucose units forming each ring is from 6 to 12 and the most common forms are those with 6 glucose units (α-cyclodextrin), 7 glucose units (β-cyclodextrin), or 8 glucose units (γ-cyclodextrin). In all cyclodextrins, each glucose unit has three —OH groups bound to the three carbon atoms in positions 2, 3, and 6. It is believed that the utilization of position-specific substituted β-cyclodextrins provides benefits over their β-cyclodextrin and completely substituted counterparts.

As used herein, the term "position-specific-substituted β-cyclodextrin" includes any β-cyclodextrin where one or more hydrogen atom of the —OH groups in positions 2 and 6 of the glucose units is replaced by a substituent —R thus forming an —OR group. Similarly, as used herein, the term "completely substituted β-cyclodextrin" includes any cyclodextrin wherein each and every one of the —OH groups in positions 2, 3, and 6 have been replaced by —OR groups. The average number of —R substituents for each glucose unit in a given sample represents the "degree of substitution" (DS) which is a number ranging from 0 to 3 where 0 corresponds to no substitutions (—OH groups in position 2, 3 and. 6 are present) and 3 corresponds to complete substitution (—OH groups in position 2, 3 and 6 are replaced by —OR groups). The average is calculated on a molar basis.

The absorbent articles of the present invention comprise substituted β-cyclodextrin complexes of one or more odor controlling organic compound, wherein the substituted β-cyclodextrin complex comprises position-specific substituted β-cyclodextrin. The substituted β-cyclodextrin complex has a substitution degree (DS) of 0.4 or more —R substituents per molecule of β-cyclodextrin, where substitution in position 2 is 20% or greater and substitution in position 6 is 20% or greater. In some embodiments, the average degree of substitution can be between about 0.4 and about 2.5, between about 0.9 and about 2.4, between about 1.2 and about 2.2, between about 1.6 and about 2.1, specifically reciting all values within these ranges and any ranges created thereby. In some embodiments, the substitution in position 2 can be between about 20% and about 90%, more preferably between about 45% and about 80%. In some embodiments, the substitution in position 6 can be between about 20% and about 90%, more preferably between about 45% and about 80%. In some embodiments, the β-cyclodextrin may encompass combinations of the preferred aspects mentioned above.

It is worth noting that position-specific substituted cyclodextrins are synthesized from conventional cyclodextrins. Via this synthesis, a variety of cyclodextrin molecules are created. For example, some of the cyclodextrin molecules may not be substituted at all, in other words, the —OH groups in positions 2, 3, and 6 are all present. Some of the cyclodextrin molecules may be position-specific substituted cyclodextrins and some of the cyclodextrins may be completely substituted, in other words, the —OH groups in positions 2, 3, and 6 are all are substituted with —OR groups. However, as discussed herein, the position-specific substituted cyclodextrins, with substitution in positions 2 and 6, provide additional benefits over the completely substituted cyclodextrins. As such, in some embodiments, the degree of substitution in position 3 is less than the degree of substitution in position 2 and/or position 6. In some embodiments, the degree of substitution in position 3 is less than about 50%, less than about 40%, less than about 30%, less than about 20%, or less than about 10%, specifically reciting all values within these ranges and any ranges created thereby.

The —R substituents in the —OR groups can be selected from any substituent having a carbon atom in position 1 (thus forming an —O—C— bond with the oxygen atom). Suitable —R substituents may include carbon atoms chains that are saturated or unsaturated and straight or branched. For example, suitable —R substituents include saturated and straight chain C1-6 alkyl, hydroxyalkyl, and mixtures thereof. Particularly suitable —R substituents have a carbon chain of from 1 to 6 carbon atoms and are selected from alkyl, hydroxyalkyl, dihydroxyalkyl, carboxy-alkyl, aryl, maltosyl, allyl, benzyl, alkanoyl, and mixtures thereof, wherein the term "alkyl" encompasses both linear and branched alkyl chains. In some embodiments, the —R substituent may be propyl, ethyl, methyl, hydroxypropyl, or mixtures thereof. Different —R substituents can be present in the same position-specific substituted cyclodextrin sample on the same cyclodextrin molecule and even on the same cyclodextrin glucose unit.

In some embodiments, all the —R substituents may be methyl substituents. In this case, the β-cyclodextrin is referred to as "methylated β-cyclodextrin". For example, a particularly suitable cyclodextrin material for the present invention is a methylated β-cyclodextrin having a DS of about 0.4 or greater, preferably from about 0.4 to about 2.5, more preferably between about 0.9 and about 2, even more preferably between about 1.2 and about 1.8, where at least about 20%, preferably between about 20% and about 90%, more preferably between about 45% and 8 about 0% of the —OH groups at positions 2 and 6, respectively, are methylated. The degree of substitution can be measured with gas chromatography as described below, with reference to methyl substituents in β-cyclodextrin.

Position-specific substituted β-cyclodextrins complexes are believed to release complexed perfume compositions more rapidly, when the absorbent article is contacted with an aqueous fluid, compared with similar β-cyclodextrin complexes that do not comprise position-specific substitutions or comprise substitutions that are distributed between positions 2, 3, and 6.

In general, cyclodextrin complexes, including substituted cyclodextrin complexes, can help prevent the evaporation of the complexed fragrance compounds. In use, moisture from urine or menses contacts the cyclodextrin complex and dissolves the crystalline structure of the cyclodextrin complex. This causes the release of the fragrance materials within the cyclodextrin complex. However, a problem exists when incorporating a cyclodextrin complex in an absorbent hygienic article. Other components, such as the absorbent core and/or superabsorbent material, of the absorbent article have a strong affinity for bodily fluids, e.g. menses and urine, including the moisture contained therein. So, when an absorbent article is insulted with bodily fluid, such as menses or urine, the cyclodextrin complex can be in competition with the absorbent core and/or superabsorbent material for the moisture contained in the bodily fluid. The absorbent core and/or superabsorbent material has a strong affinity for the moisture and once the absorbent core and/or superabsorbent material contacts the bodily fluid, the absorbent core and/or superabsorbent material effectively "lock-up" the moisture of the bodily fluid, thereby reducing the amount of moisture available to contact the cyclodextrin complex. So, only a limited amount of moisture may be available to dissolve the cyclodextrin crystalline structure and release the fragrance compounds to provide odor control benefits.

With conventional cyclodextrin complexes, a larger amount of moisture may be required to solubilize the cyclodextrin molecules and release the encapsulated fragrance. The same holds true for completely substituted cyclodextrins where positions 2, 3, and 6 are substituted. However, the inventors have surprisingly found that with the use of a position-specific-substituted cyclodextrins, as described herein, less moisture may be required to solubilize the position-specific-substituted cyclodextrins. So, more of the complexed fragrance compounds may be released without compromising the absorbent or retention capacity of the absorbent article.

The odor control compositions of the present disclosure may comprise about 40% or more substituted β-cyclodextrin, more preferably about 50% or more, specifically reciting all values within these ranges and any ranges created thereby. For example, the substituted cyclodextrin may be present in the odor control composition of the present disclosure in an amount of from about 40 percent to about 60 percent by weight or more preferably about 50 percent to about 60 percent by weight, specifically reciting all values within this range and any range created thereby. Without wishing to be bound by theory, it is believed that at levels above about 60 percent by weight, the solubility of the substituted cyclodextrin may become problematic.

Determination of Methyl Substituent Distribution

The Methyl Substituent Distribution in Methylated β-Cyclodextrin (hereafter "mBCD") is measured using gas chromatograph with split/splitless injection and flame ionization detection (a suitable instrument is the Agilent 7890B GC available from Agilent, Santa Clara, CA, or equivalent). The β-cyclodextrin is hydrolyzed, reduced and then acetylated for analysis. Additionally, gas chromatography/mass spectrometry (a suitable unit is the 5777A Mass Selective Detector (MSD) also available from Agilent, or equivalent) can be used to identify the acetylated products to confirm peak identity. Both instruments are calibrated and operated as per the manufacturer's instructions.

Derivatization reagents must be used with a purity of greater than or equal to 99%, except for the borohydride (98%), and can be obtained from Sigma Aldrich, or equivalent. Fifty mg of mBCD and 5 mL of 2 M trifluoroacetic acid solution were added to a 50 mL round bottom flask with magnetic stir bar. The reaction vessel was fitted with a water cooled condenser and heated to reflux for 4 hours while stirring. After complete hydrolysis, the reaction mixture was evaporated under vacuum to dryness. Next, the hydrolysis product, 10 mL of ammonium hydroxide (32% in water), and 101 mg sodium borohydride (2.67 mmols) were stirred in a 50 mL round bottom flask at 40° C. for 2 hours. Residual sodium borohydride was quenched via dropwise addition of glacial acetic acid until the solution pH was in the range of 4.5 to 6. The resulting boric acid was removed via sequential additions of methanol (4×20 mL) to the reaction mixture, followed by evaporation under vacuum at 40° C. The reaction product, 10 mL of pyridine, 36 mg of 4-dimethylaminopyridine (0.2947 mmols), and 630 μL acetic anhydride (630 μL, 6.6794 mmols) were added to a 50 mL round bottom flask with magnetic stir bar. The reaction was stirred vigorously at room temperature for 20 hours. The acetylated alditol products were extracted with 10 mL chloroform using a 60 mL separatory funnel and washed three times with 10 mL of deionized water. The chloroform extract was diluted (1:3) with chloroform, and sampled for gas chromatography analysis.

The GC analysis was performed on a 30 m long by 0.250 mm inner diameter column with 5% phenyl arylene methylpolysiloxane phase at a 1 μm film thickness (a suitable column is the DB5MS available from Agilent, or equivalent USP G27 phase). The GC inlet was set at 280° C. in Split mode (5:1 split, glass wool packed liner) with a 3 mL septum purge. A 1.5 mL/minute column flow of helium was set at an oven temperature of 150° C. under constant flow conditions. The detector was set at 300° C. with flows set to the instrument manufacturer's recommended conditions. The GC oven was programmed to begin at 150° C. for 1 min, then ramp at 15° C./min to 250° C., hold for 4 min at 250° C., then ramp at 10° C./min to 315° C. and a final hold of 1 min. 1 μL of the chloroform extract is injected for analysis. It is understood that one skilled in the art can slightly modify the chromatographic conditions to achieve the necessary separation as needed.

GC-MS analysis is performed under the same chromatographic conditions as for the flame ionization detection (FID). The temperature for the MSD transfer line and detector were set to 280° C. and 300° C. respectively. The MSD was configured for electron ionization at −70 eV scanning from m/z to 400 m/z with a scan rate of 257 msec/scan. The Total Ion Chromatogram was evaluated using the fragmentation data in Table 7 to assign retention order of the glucitol products. The retention order was then applied to the GC-FID chromatograms.

For quantification, each peak measured by GC-FID that is associated with a glucitol monomer is integrated to give a peak area. The areas are then used in Equations 1 and 2 to calculate the mole percent (mol %) of each glucitol monomer and reported to the nearest 0.1 mol %. The results from the example chromatogram are given in Table 7.

$$\text{mols glucitol } A = \text{mg } \beta \text{ cyclodextrin} \times \frac{\text{FID area counts for glucitol } A}{\sum \text{FID area counts of all glucitol monomers}} \times \frac{1}{MW_A} \quad \text{Eq. 1}$$

where $MW_A$ is the molecular weight of the acetylated glucitol and mg β-cyclodextrin is the starting mass of underivatized mBCD.

$$\text{mol \% glucitol } A = \frac{\text{mols glucitol } A}{\sum \text{mols of all glucitol monomers}} \times 100\% \quad \text{Eq. 2}$$

Additionally, the mol % of particular substitutions are calculated by addition of the individual mol %. For example, mol % of all glucitols methylated at the 6 position (denoted in Table 8 as X6) would be the sum of the mol % of S2,6, S3,6 and S2,3,6.

The average degree of substitution was calculated according to Equation 3. Mol % for all glucitol monomers sharing the same number of methyl substituents (0, 1, 2, or, 3) were summed, multiplied by their respective methyl substituent number (0, 1, 2, or 3) and divided by 100. The result is reported to the nearest 0.1 mol %.

$$DS \text{ per glucose unit} = \frac{1}{100} \sum_{i=0}^{3} i \cdot \text{mol \% } x \quad \text{Eq. 3}$$

Where mol % x is equal to the summation of glucitol monomers having same number of methyl groups.

Data from a gas chromatogram of acetylated D-glucitol derivatives prepared from mBCD using the procedure described above is provided in Table 7. Table 7 shows Selected Fragments of Ionized D-Glucitol Acetates while FIG. 5 is an FID trace.

The position-specific-substituted cyclodextrins of the present invention can be prepared by using methods known in the art for the selective modifications of cyclodextrins. For example, by using methods described by Khan et al. (Chem. Rev. 1998, 98, 1977-1996). Alternative synthesis routes for the preparation of the position-specific-substituted cyclodextrins of the invention are known to the chemists skilled in the field and broadly described in literature. For example, U.S. Pat. No. 5,710,268 and the textbooks "Advances in cyclodextrin chemistry" by Werz, Vidal, Guiou, Sollogoub, Matthieu, Wiley-VCH Verlag GmbH ed. 2014; and "Modern Synthetic Methods in Carbohydrate Chemistry: From Monosaccharides to Complex Glycoconjugates", Werz, Daniel B.; Vidal, Sebastian, eds, 2014 Wiley-VHC Verlag GmbH provide additional details.

Once the position-specific-substituted cyclodextrins is provided, substituted cyclodextrin complexes of odor controlling organic compounds which are active against malodors can be prepared as known in the art for the known cyclodextrin complexes, for example using the kneading method described in U.S. Pat. Nos. 5,571,782 and 5,543,157 or, using the spray drying method described in WO2008/104690A2.

TABLE 7

| Compoud | m/z |||||||||||||||
|---|---|---|---|---|---|---|---|---|---|---|---|---|---|---|---|
| | 99 | 113 | 117 | 129 | 145 | 157 | 159 | 161 | 189 | 217 | 231 | 233 | 261 | 289 | 305 | 333 |
| 2,3,6-Tri-O-methyl-D-glucitol, 1,4,5-triacetate | X | X | X | X | | | X | | | | X | | | | | |
| 2,6-Di-O-methyl-D-glucitol, 1,3,4,5-tetraacetate | | | X | X | | X | | | | X | | | | X | | |
| 3,6-Di-O-methyl-D-glucitol, 1,2,4,5-tetraacetate | X | X | | X | | X | X | | X | | | X | | | | |
| 2,3-Di-O-methyl-D-glucitol, 1,4,5,6-tetraacetate | X | | X | | | | X | X | | | X | | X | | X | |
| 6-O-methyl-D-glucitol, 1,2,3,4,5-pentaacetate | X | | | X | X | X | X | | | X | X | | | X | | X |
| 2-O-methyl-D-glucitol, 1,3,4,5,6-pentaacetate | | | X | X | | X | X | | | | X | | | | | X |
| 3-O-methyl-D-glucitol, 1,2,4,5,6-pentaacetate | X | | | X | X | | X | | X | X | X | | X | | | |
| D-glucitol hexaccetate | | | | | X | X | | | | | X | | | X | | |

X = Fragment present in mass spectra

Table 8 provides data of the substituent distribution for mBCD, the average degree of methylation of the O6 and O2 positions, and the average degree of substitution (DS) per glucose unit.

TABLE 8

| Substituent Distribution | mol % |
|---|---|
| Unsubstituted | 9.1 |
| S2 | 21.9 |
| S3 | 5.8 |
| S6 | 10.4 |
| S2, 3 | 13.7 |

TABLE 8-continued

| Substituent Distribution | mol % |
|---|---|
| S2, 6 | 20.1 |
| S3, 6 | 6.1 |
| S2, 3, 6 | 12.8 |
| X6 | 49.5 |
| X2 | 68.6 |
| X3 | 38.5 |
| Avg. DS per Glusose Unit: | 1.6 |

An exemplary odor control composition, including components and weight percentages of components, is shown in Table 9.

TABLE 9

| Material | % Liquid Formula 1 |
|---|---|
| mBCD | 50 |
| SPMB 2 (perfume) | 5.2 |
| Surfactant (silicone) | 0.5 |
| Preservative | 0.8 |
| Water (solvent) | 43.5 |

The weight percentages for the components of the odor control composition that are provided in Table 9 are for the aqueous form of the composition. The weight percentages of the components of the odor control composition upon drying (no water) are provided in Table 10.

TABLE 10

| Material | % solid (solvent evaporated) |
| --- | --- |
| mBCD | 88.5 |
| SPMB 2 (perfume) | 9.2 |
| Surfactant (silicone) | 0.9 |
| Preservative | 1.4 |
| Water (solvent) | — |

In the dried form, the odor control composition of the present disclosure may comprise substituted cyclodextrin at a weight percentage of from about 80 percent to about 90 percent or more preferably from about 85 percent to about 90 percent, specifically reciting all values within the ranges and any ranges created thereby. The perfume may be present in an amount of from about 8 percent to about 10 percent or more preferably from about 9 percent to about 10 percent, specifically reciting all values within these ranges and any ranges created thereby. The surfactant may be present in an amount of from about 0.3 percent to about 2.0 percent, more preferably from about 0.5 percent to about 2.0 percent or most preferably from about 0.8 percent to about 2.0 percent, specifically reciting all values within these ranges and any ranges created thereby. And the preservative may be present in an amount of from 0.5 percent to 2.0 percent, more preferably from about 0.8 percent to about 2.0 percent or most preferably from about 1.2 percent to about 2.0 percent, specifically including all values within these ranges and any ranges created thereby.

Extraction of mBCD from Absorbent Articles mBCD can be collected from whole articles or components by Soxhlet extraction with water and the subsequent removal of solvent (water) using a rotary-evaporator. For further analysis of methyl substitution, enough articles need to be extracted to collect 50 mg of mBCD.

Non-Complexed Perfume Composition

As discussed above, it may be desirable to include two or more perfume or fragrance materials in the absorbent article, with at least one of the fragrance materials being complexed with the β-cyclodextrins and at least one other fragrance material being added as a non-complexed, neat fragrance into the absorbent article. In these embodiments, it is preferred for the complexed fragrance and the non-complexed, neat fragrances to be different from one another. The differences can include types (including, for example, chemical make-up) and numbers of perfumes or other aromatic materials employed in the individual fragrance materials, the concentration level, character, or a combination thereof.

The non-complexed perfume composition may comprise one or more perfume raw materials and an organic solvent, which functions as a carrier for the perfume raw material(s). The solvent may be any suitable material including dipropylene glycol and isopropyl myristate. However, dipropylene glycol may negatively impact a visual signal on the absorbent article over time and/or inks disposed on a consumer-facing surface of package material, in which the absorbent articles are packaged. Isopropyl myristate is not believed to have this same adverse effect. As such, isopropyl myristate may be utilized as the preferred solvent.

The neat or non-complexed fragrance material may include the materials delineated above, or may include other perfumes/aromatic materials known to a person of ordinary skill in the art of creating fragrances. Typical fragrances are described in Arctander, Perfume and Flavour Chemicals (Aroma Chemicals), Vol. I and II (1969) and Arctander, Perfume and Flavour Materials of Natural Origin (1960). U.S. Pat. No. 4,322,308, issued to Hooper et al., Mar. 30, 1982 and U.S. Pat. No. 4,304,679, issued to Hooper et al., Dec. 8, 1981 disclose suitable fragrance materials including, but not limited to, volatile phenolic substances (such as iso-amyl salicylate, benzyl salicylate, and thyme oil red), essence oils (such as geranium oil, patchouli oil, and petitgrain oil), citrus oils, extracts and resins (such as benzoin siam resinoid and opoponax resinoid), "synthetic" oils (such as Bergamot™ 37 and Bergamot™ 430, Geranium™ 76 and Pomeransol™ 314); aldehydes and ketones (such as B-methyl naphthyl ketone, p-t-butyl-A-methyl hydrocinnamic aldehyde and p-t-amyl cyclohexanone), polycyclic compounds (such as coumarin and beta-naphthyl methyl ether), esters (such as diethyl phthalate, phenylethyl phenylacetate, non-anolide 1:4).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. A disposable absorbent article comprising a topsheet, a backsheet, and an absorbent core disposed between the topsheet and the backsheet, the disposable absorbent article further comprising: an aqueous-based odor control composition, which comprises a perfume complexed with a methylated beta-cyclodextrin (m-BCD), and a non-complexed perfume composition, which comprises a non-complexed perfume and an organic solvent, wherein the odor control composition and the non-complexed perfume composition do not substantially overlap.

2. The disposable absorbent article of claim 1, wherein the perfume composition complexed with the methylated beta-cyclodextrin (m-BCD) is different than the non-complexed perfume composition.

3. The disposable absorbent article of claim 1, wherein the odor control composition further comprises from about 0.5 percent to 2.0 percent by weight of a preservative and from about 0.3 percent to about 2.0 percent by weight of a cyclodextrin-compatible surfactant.

4. The disposable absorbent article of claim 3, wherein the preservative comprises a compound represented by the following Structure I:

$$HO-CH_2-CH_2-R \quad (I)$$

wherein R is a substituted or unsubstituted phenyl group or a substituted or unsubstituted phenoxy group.

5. The disposable absorbent article of claim 1, wherein the methylated beta-cyclodextrin (m-BCD) has degree of substitution (DS) of about 0.4 to about 2.5.

6. The disposable absorbent article of claim 5, wherein about 20 percent to about 90 percent of the substitution occurs at position 2 or position 6.

7. The disposable absorbent article of claim 5, wherein less than about 50% of the substitution occurs at position 3.

8. The disposable absorbent article of claim 1, wherein the absorbent article further comprises an overall length generally parallel to a Y-axis and an overall width parallel to an X-axis, wherein the odor control composition is provided in a target zone of the absorbent article.

9. The disposable absorbent article of claim 8, wherein the target zone is disposed between two outer zones, and wherein the target zone comprises more than about 20 percent to less than about 80 percent of the overall length of the absorbent article.

10. The disposable absorbent article of claim 8, wherein the target zone is disposed between two outer zones, and wherein the target zone comprises more than about 30 percent to less than about 70 percent of the overall length of the absorbent article.

11. The disposable absorbent article of claim 1, wherein the aqueous-based odor control composition is provided on a garment-facing side of the absorbent core.

12. The disposable absorbent article of claim 1, wherein the non-complexed perfume composition comprises a solvent selected from the group consisting of dipropylene glycol, isopropyl myristate, and combinations thereof.

13. The disposable absorbent article of claim 1, wherein the non-complexed perfume composition is provided on a garment-facing side of the absorbent core.

14. The disposable absorbent article of claim 1, wherein the absorbent article further comprises a secondary topsheet disposed between the topsheet and the absorbent core.

15. The disposable absorbent article of claim 14, wherein the aqueous-based odor control composition is provided on a garment-facing side of the secondary topsheet and the non-complexed perfume composition is provided on a garment-facing side of the absorbent core.

16. The disposable absorbent article according to claim 3, wherein the cyclodextrin-compatible surfactant is polyalkyleneoxide polysiloxane having the general formula:

$$(CH_3)_3SiO-[Si(CH_3)_2O]_n-[Si(CH_3)(R^1)O]_ySi(CH_3)_3$$

wherein a+b are from about 1 to about 50, and $R^1$ is the same or different and is selected from the group consisting of methyl and a poly(ethyleneoxide/propyleneoxide) copolymer groups having the general formula;

$$(CH_2)_nO(C_2H_4O)_c(C_3H_6O)_dR^2$$

with at least one $R^1$ being a poly(ethyleneoxide (propyleneoxide) copolymer group, and wherein n is 3 or 4; total c (for all polyalkyleneoxy side groups) has a value of from 1 to about 100; d is from 0 to about 14; c+d has a value of from about 5 to about 150; and each $R^2$ is the same or different and is selected from the group consisting of hydrogen, an alkyl having 1 to 4 carbon atoms, and an acetyl group.

17. A method of making a disposable absorbent article having an aqueous-based odor control composition and a non-complexed perfume composition, the method comprising the steps of:
obtaining a topsheet material;
obtaining a backsheet material;
obtaining an absorbent core material;
placing the absorbent core material between the topsheet and the backsheet material;
obtaining one or more optional materials which are disposed between the topsheet and the absorbent core and/or the absorbent core and the backsheet;
providing an aqueous-based odor control composition, which comprises a perfume complexed with a methylated beta-cyclodextrin (m-BCD);
providing a non-complexed perfume composition, which comprises a non-complexed perfume and an organic solvent;
applying a pattern of the aqueous-based odor control composition to at least one of the topsheet, the backsheet, the absorbent core, or the optional materials and applying a pattern of the non-complexed perfume composition to at least one of the topsheet, the backsheet, the absorbent core, or the optional materials, wherein the odor control composition pattern and the non-complexed perfume composition pattern do not substantially overlap.

* * * * *